United States Patent
Seo et al.

(10) Patent No.: US 10,439,267 B2
(45) Date of Patent: Oct. 8, 2019

(54) ELECTRONIC DEVICE INCLUDING ANTENNA

(71) Applicant: Samsung Electronics Co., Ltd., Suwon-si, Gyeonggi-do (KR)

(72) Inventors: Jung Hoon Seo, Hwaseong-si (KR); Kyung Gu Kim, Suwon-si (KR); Kyung Il Seo, Suwon-si (KR); Young Jun Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/928,567

(22) Filed: Mar. 22, 2018

(65) Prior Publication Data

US 2018/0277929 A1 Sep. 27, 2018

(30) Foreign Application Priority Data

Mar. 24, 2017 (KR) ........................ 10-2017-0037775

(51) Int. Cl.
| | |
|---|---|
| *H04Q 5/10* | (2006.01) |
| *H01Q 1/24* | (2006.01) |
| *H01Q 5/40* | (2015.01) |
| *H04B 1/40* | (2015.01) |
| *H01Q 5/20* | (2015.01) |

(Continued)

(52) U.S. Cl.
CPC ............ *H01Q 1/241* (2013.01); *H01Q 1/243* (2013.01); *H01Q 1/525* (2013.01); *H01Q 5/20* (2015.01); *H01Q 5/328* (2015.01); *H01Q 5/335* (2015.01); *H01Q 5/40* (2015.01); *H01Q 9/42* (2013.01); *H01Q 21/28* (2013.01); *H04B 1/40* (2013.01)

(58) Field of Classification Search
CPC .............................. H01Q 1/241; H01Q 1/243
See application file for complete search history.

(56) References Cited

U.S. PATENT DOCUMENTS

| | | |
|---|---|---|
| 6,937,191 B2 | 8/2005 | Baliarda |
| 7,250,918 B2 | 7/2007 | Baliarda |
| | (Continued) | |

FOREIGN PATENT DOCUMENTS

| | | |
|---|---|---|
| CN | 205693664 U | 11/2016 |
| EP | 2 663 906 B1 | 7/2016 |
| | (Continued) | |

*Primary Examiner* — Tuan H Nguyen
(74) *Attorney, Agent, or Firm* — Jefferson IP Law, LLP

(57) ABSTRACT

An electronic device including an antenna is provided. The electronic device includes a first antenna radiator that resonates in a first band, a second antenna radiator that resonates in second and third bands higher than the first band, a third antenna radiator that resonates in the second and third bands, a communication circuit, a first feeding part electrically connecting the communication circuit and the first antenna radiator, a second feeding part electrically connecting the communication circuit and the second antenna radiator, and a third feeding part electrically connecting the communication circuit and the third antenna radiator. The communication circuit receives a signal in the second band while transmitting and receiving a signal in the second band by using the second antenna radiator and receives a signal in the third band while transmitting and receiving a signal in the third band using the third antenna radiator.

7 Claims, 20 Drawing Sheets

(51) Int. Cl.
*H01Q 1/52* (2006.01)
*H01Q 9/42* (2006.01)
*H01Q 21/28* (2006.01)
*H01Q 5/328* (2015.01)
*H01Q 5/335* (2015.01)

(56) References Cited

U.S. PATENT DOCUMENTS

| | | |
|---|---|---|
| 7,557,768 B2 | 7/2009 | Baliarda et al. |
| 7,932,870 B2 | 4/2011 | Baliarda et al. |
| 8,228,256 B2 * | 7/2012 | Puente Baliarda .... H01Q 1/246 343/844 |
| 8,772,650 B2 | 7/2014 | Merz et al. |
| 8,896,493 B2 | 11/2014 | Baliarda et al. |
| 9,203,463 B2 | 12/2015 | Asrani et al. |
| 9,680,206 B2 * | 6/2017 | Youn .................. H04M 1/0249 |
| 9,819,383 B2 | 11/2017 | Youn et al. |
| 9,894,787 B2 | 2/2018 | Merz |
| 9,905,940 B2 | 2/2018 | Baliarda et al. |
| 9,935,359 B2 | 4/2018 | Kim et al. |
| 9,985,679 B2 | 5/2018 | Youn et al. |
| 2002/0171601 A1 | 11/2002 | Baliarda |
| 2005/0030247 A1 | 2/2005 | Baliarda |
| 2005/0146481 A1 | 7/2005 | Baliarda |
| 2008/0036676 A1 | 2/2008 | Baliarda |
| 2009/0267863 A1 | 10/2009 | Baliarda et al. |
| 2011/0156986 A1 | 6/2011 | Baliarda et al. |
| 2012/0175165 A1 | 7/2012 | Merz et al. |
| 2012/0262359 A1 | 10/2012 | Baliarda et al. |
| 2014/0311767 A1 | 10/2014 | Merz et al. |
| 2015/0065151 A1 | 3/2015 | Baliarda et al. |
| 2015/0155614 A1 | 6/2015 | Youn et al. |
| 2015/0171916 A1 | 6/2015 | Asrani et al. |
| 2016/0365623 A1 | 12/2016 | Kim et al. |
| 2017/0230073 A1 | 8/2017 | Youn et al. |
| 2017/0358846 A1 | 12/2017 | Lin et al. |
| 2018/0034148 A1 | 2/2018 | Nam et al. |
| 2018/0041239 A1 | 2/2018 | Youn et al. |
| 2018/0145424 A1 | 5/2018 | Baliarda et al. |
| 2018/0168058 A1 | 6/2018 | Merz et al. |
| 2018/0241430 A1 | 8/2018 | Youn et al. |

FOREIGN PATENT DOCUMENTS

| | | |
|---|---|---|
| KR | 10-2015-0064566 A | 6/2015 |
| KR | 10-2016-0060352 A | 5/2016 |
| KR | 10-1640787 B1 | 7/2016 |
| WO | 2018/021888 A1 | 2/2018 |

* cited by examiner

ELECTRONIC DEVICE INCLUDING ANTENNA

CROSS-REFERENCE TO RELATED APPLICATION(S)

This application is based on and claims priority under 35 U.S.C. § 119 to Korean Patent Application No. 10-2017-0037775, filed on Mar. 24, 2017, in the Korean Intellectual Property Office, the disclosure of which is incorporated by reference herein in its entirety.

TECHNICAL FIELD

The disclosure relates to a technology for using a plurality of antennas included in an electronic device.

BACKGROUND

Wireless communication technologies enable transmission and reception of various forms of information, such as text, images, videos, speech, or the like. These wireless communication technologies have been developed to more rapidly transmit and receive more information. With the development of the wireless communication technologies, electronic devices capable of wireless communication, such as smartphones, tablet personal computers (PCs), or the like, may provide services using communication functions, such as a global positioning system (GPS), Wi-Fi, long term evolution (LTE), near field communication (NFC), magnetic stripe transmission (MST), or the like. The electronic devices may include one or more antennas to perform communication.

The above information is presented as background information only to assist with an understanding of the disclosure. No determination has been made, and no assertion is made, as to whether any of the above might be applicable as prior art with regard to the disclosure.

SUMMARY

The plurality of antennas included in the electronic device has to be electrically isolated from one another to enhance efficiency of the plurality of antennas. In the case of transmitting signals by using the plurality of antennas, the plurality of antennas need to be further electrically isolated from one another. Meanwhile, the plurality of antennas included in the electronic devices of the related art may have a limitation in covering multiband, and it may be difficult to perform inter-band carrier aggregation by using three or more antennas included in the electronic devices according to the related art.

Aspects of the disclosure are to address at least the above-mentioned problems and/or disadvantages and to provide at least the advantages described below. Accordingly, an aspect of the disclosure is to provide an electronic device capable of efficiently using three or more antennas disposed adjacent to one another.

In accordance with an aspect of the disclosure, an electronic device is provided. The electronic device includes a housing including a first plate, a second plate facing away from the first plate, and a lateral member surrounding a space between the first plate and the second plate, a touch screen display exposed through a portion of the first plate, at least one wireless communication circuit positioned inside the housing, and at least one processor positioned inside the housing and electrically connected with the touch screen display and the at least one wireless communication circuit, in which the lateral member includes a first conductive part, a second conductive part, a third conductive part, and a fourth conductive part that form a substantially rectangular shape together when viewed from above the first plate, a first non-conductive part interposed between the first conductive part and the second conductive part, a second non-conductive part interposed between the second conductive part and the third conductive part, a third non-conductive part interposed between the third conductive part and the fourth conductive part, and a fourth non-conductive part interposed between the fourth conductive part and the first conductive part, and the at least one wireless communication circuit is electrically connected with a first point in the first conductive part that is close to the first non-conductive part, a second point in the second conductive part that is close to the first non-conductive part, a third point in the fourth conductive part that is close to the fourth non-conductive part, a fourth point in the third conductive part, a fifth point in the fourth conductive part that is close to the third non-conductive part, and a sixth point in the second conductive part that is close to the second non-conductive part. The at least one wireless communication circuit transmits and receives a cellular signal that includes a high-band signal, a mid-band signal having a frequency lower than a frequency of the high-band signal, and a low-band signal having a frequency lower than a frequency of the mid-band signal, and receives the mid-band signal through the second point, the third point, the fourth point, and the fifth point.

In accordance with another aspect of the disclosure, an electronic device is provided. The electronic device includes a first antenna radiator for resonating in a first band and is disposed in the middle of one end of the electronic device, a second antenna radiator for resonating in second and third bands higher than the first band and is spaced apart from the first antenna radiator and disposed adjacent to one end of the first antenna radiator, a third antenna radiator for resonating in the second and third bands and is spaced apart from the first and second antenna radiators, a communication circuit, a first feeding part electrically connecting the communication circuit and the first antenna radiator, a second feeding part electrically connecting the communication circuit and the second antenna radiator, and a third feeding part electrically connecting the communication circuit and the third antenna radiator. The communication circuit receives a signal in the second band by using the third antenna radiator while transmitting and receiving a signal in the second band by using the second antenna radiator, and receives a signal in the third band by using the second antenna radiator while transmitting and receiving a signal in the third band by using the third antenna radiator.

According to various embodiments of the disclosure, by configuring adjacent antennas of a plurality of main antennas to support signals in different frequency bands, it is possible to enhance isolation between the plurality of main antennas.

According to various embodiments of the disclosure, by applying different feeding methods to adjacent antennas of a plurality of main antennas, it is possible to enhance isolation between the plurality of main antennas.

According to various embodiments of the disclosure, by employing a switch and a tuner connected with a plurality of main antennas, it is possible to enhance efficiency of the plurality of main antennas.

According to various embodiments of the disclosure, by employing three or more main antennas electrically isolated from one another, it is possible to diversify a configuration of a front-end module connected with the plurality of main antennas.

According to various embodiments of the disclosure, by employing three or more main antennas electrically isolated from one another, it is possible to provide an electronic device capable of supporting 4Rx in a multiple input multiple output (MIMO) environment and performing interband carrier aggregation by using the three or more antennas.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
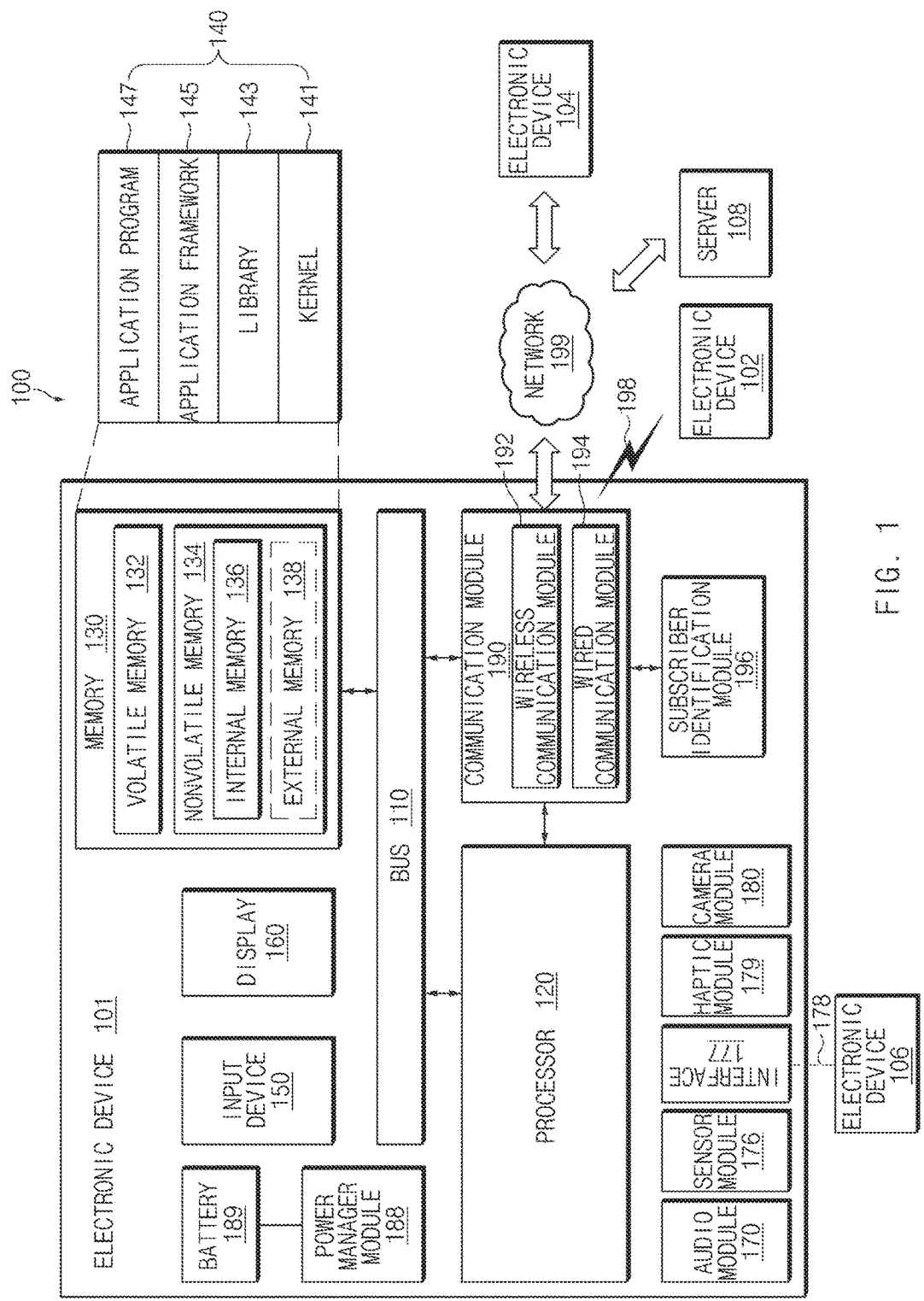
FIG. 1 is a block diagram of an electronic device in a network environment according to various embodiments of the disclosure.

FIG. 1 illustrates a block diagram of an electronic device 101 in a network environment 100, according to various embodiments of the disclosure. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) audio layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HIVIDs)), a fabric or garment-integrated type (e.g., an electronic apparel), a body-attached type (e.g., a skin pad or tattoos), or a bio-implantable type (e.g., an implantable circuit).

According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., global navigation satellite system (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 1, under the network environment 100, the electronic device 101 may communicate with an electronic device 102 through local wireless communication 198 or may communication with an electronic device 104 or a server 108 through a network 199. According to an embodiment, the electronic device 101 may communicate with the electronic device 104 through the server 108.

According to an embodiment, the electronic device 101 may include a bus 110, a processor 120, a memory 130, an input device 150 (e.g., a micro-phone or a mouse), a display device 160, an audio module 170, a sensor module 176, an interface 177, a haptic module 179, a camera module 180, a power management module 188, a battery 189, a communication module 190, and a subscriber identification module 196. According to an embodiment, the electronic device 101 may not include at least one (e.g., the display device 160 or the camera module 180) of the above-described elements or may further include other element(s).

The bus 110 may interconnect the above-described elements 120 to 190 and may include a circuit for conveying signals (e.g., a control message or data) between the above-described elements.

The processor 120 may include one or more of a central processing unit (CPU), an application processor (AP), a graphic processing unit (GPU), an image signal processor (ISP) of a camera or a communication processor (CP). According to an embodiment, the processor 120 may be implemented with a system on chip (SoC) or a system in package (SiP). For example, the processor 120 may drive an operating system (OS) or an application to control at least one of another element (e.g., hardware or software element) connected to the processor 120 and may process and compute various data. The processor 120 may load a command or data, which is received from at least one of other elements (e.g., the communication module 190), into a volatile memory 132 to process the command or data and may store the result data into a nonvolatile memory 134.

The memory 130 may include, for example, the volatile memory 132 or the nonvolatile memory 134. The volatile memory 132 may include, for example, a random-access memory (RAM) (e.g., a dynamic RAM (DRAM), a static RAM (SRAM), or a synchronous DRAM (SDRAM)). The nonvolatile memory 134 may include, for example, a programmable read-only memory (PROM), a one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 134 may be configured in the form of an internal memory 136 or the form of an external memory 138 which is available through connection only if necessary, according to the connection with the electronic device 101. The external memory 138 may further include a flash drive such as compact flash (CF), secure digital (SD), micro secure digital (micro-SD), mini secure digital (mini-SD), extreme digital (xD), a multimedia card (MMC), or a memory stick. The external memory 138 may be operatively or physically connected with the electronic device 101 in a wired manner (e.g., a cable or a universal serial bus (USB)) or a wireless (e.g., Bluetooth) manner.

For example, the memory 130 may store, for example, at least one different software element, such as an instruction or data associated with the program 140, of the electronic device 101. The program 140 may include, for example, a kernel 141, a library 143, an application framework 145 or an application program (interchangeably, "application") 147.

The input device 150 may include a microphone, a mouse, or a keyboard. According to an embodiment, the keyboard may include a keyboard physically connected or a virtual keyboard displayed through the display 160.

The display 160 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 101.

The audio module 170 may convert, for example, from a sound into an electrical signal or from an electrical signal into the sound. According to an embodiment, the audio module 170 may acquire sound through the input device 150 (e.g., a microphone) or may output sound through an output device (not illustrated) (e.g., a speaker or a receiver) included in the electronic device 101, an external electronic device (e.g., the electronic device 102 (e.g., a wireless speaker or a wireless headphone)) or an electronic device 106 (e.g., a wired speaker or a wired headphone) connected with the electronic device 101.

The sensor module 176 may measure or detect, for example, an internal operating state (e.g., power or temperature) of the electronic device 101 or an external environment state (e.g., an altitude, a humidity, or brightness) to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 176 may further include a control circuit for controlling at least one or more sensors included therein. According to an embodiment, the sensor module 176 may be controlled by using the processor 120 or a processor (e.g., a sensor hub) separate from the processor 120. In the case that the separate processor (e.g., a sensor hub) is used, while the processor 120 is in a sleep state, the separate processor may operate without awakening the processor 120 to control at least a portion of the operation or the state of the sensor module 176.

According to an embodiment, the interface 177 may include a high definition multimedia interface (HDMI), a universal serial bus (USB), an optical interface, a recommended standard 232 (RS-232), a D-subminiature (D-sub), a mobile high-definition link (MI-IL) interface, a SD card/MMC (multi-media card) interface, or an audio interface. A connector 178 may physically connect the electronic device 101 and the electronic device 106. According to an embodiment, the connector 178 may include, for example, an USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor (ISP), or a flash (e.g., a light emitting diode (LED) or a xenon lamp).

The power management module 188, which is to manage the power of the electronic device 101, may constitute at least a portion of a power management integrated circuit (PMIC).

The battery 189 may include a primary cell, a secondary cell, or a fuel cell and may be recharged by an external power source to supply power at least one element of the electronic device 101.

The communication module 190 may establish a communication channel between the electronic device 101 and an external device (e.g., the first external electronic device 102, the second external electronic device 104, or the server 108). The communication module 190 may support wired communication or wireless communication through the established communication channel. According to an embodiment, the communication module 190 may include a wireless communication module 192 or a wired communication module 194. The communication module 190 may communicate with the external device through a first network, such as the local wireless communication 198 (e.g. a wireless local area network such as Bluetooth or infrared data association (IrDA)) or a second network, such as the network 199 (e.g., a wireless wide area network such as a cellular network) through a relevant module among the wireless communication module 192 or the wired communication module 194.

The wireless communication module 192 may support, for example, cellular communication, local wireless communication, global navigation satellite system (GNSS) communication. The cellular communication may include, for example, long-term evolution (LTE), LTE advance (LTE-A), code division multiple access (CMA), wideband CDMA (WCDMA), universal mobile telecommunications system (UMTS), wireless broadband (WiBro), or global system for mobile communications (GSM). The local wireless communication may include Wi-Fi, WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 192 supports cellar communication, the wireless communication module 192 may, for example, identify or authenticate the electronic device 101 within a communication network using the subscriber identification module (e.g., a SIM card) 196. According to an embodiment, the wireless communication module 192 may include a communication processor (CP) separate from the processor 120 (e.g., an application processor (AP)). In this case, the CP may perform at least a portion of functions associated with at least one of elements 110 to 196 of the electronic device 101 in substitute for the processor 120 when the processor 120 is in an inactive (sleep) state, and together with the processor 120 when the processor 120 is in an active state. According to an embodiment, the wireless communication module 192 may include a plurality of communication modules, each supporting only a relevant communication scheme among cellular communication, local wireless communication, or a GNSS communication.

The wired communication module 194 may include, for example, include a local area network (LAN) service, a power line communication, or a plain old telephone service (POTS).

For example, the first network 198 may employ, for example, Wi-Fi direct or Bluetooth for transmitting or receiving commands or data through wireless direct connection between the electronic device 101 and the first external electronic device 102. The second network 199 may include a telecommunication network (e.g., a computer network such as a LAN or a WAN, the Internet or a telephone network) for transmitting or receiving commands or data between the electronic device 101 and the second electronic device 104.

According to various embodiments, the commands or the data may be transmitted or received between the electronic device 101 and the second external electronic device 104 through the server 108 connected with the second network 199. Each of the first and second external electronic devices 102 and 104 may be a device of which the type is different from or the same as that of the electronic device 101. According to various embodiments, all or a part of operations that the electronic device 101 will perform may be executed by another or a plurality of electronic devices (e.g., the electronic devices 102 and 104 or the server 108).

According to an embodiment, in the case that the electronic device 101 executes any function or service automatically or in response to a request, the electronic device 101 may not perform the function or the service internally, but may alternatively or additionally transmit requests for at least a part of a function associated with the electronic device 101 to any other device (e.g., the electronic device 102 or 104 or the server 108). The other electronic device (e.g., the electronic device 102 or 104 or the server 108) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

According to an embodiment, an electronic device may include a housing that includes a first plate, a second plate facing away from the first plate, and a lateral member surrounding a space between the first plate and the second plate. The first plate may be, for example, a cover glass. The second plate may be, for example, a back cover. The lateral member may be, for example, a metal frame. According to an embodiment, the lateral member may include a plurality of conductive parts and a plurality of non-conductive parts that form a substantially rectangular shape together when viewed from above the first plate. The electronic device may further include a touch screen display exposed through a portion of the first plate.

Figure 2:
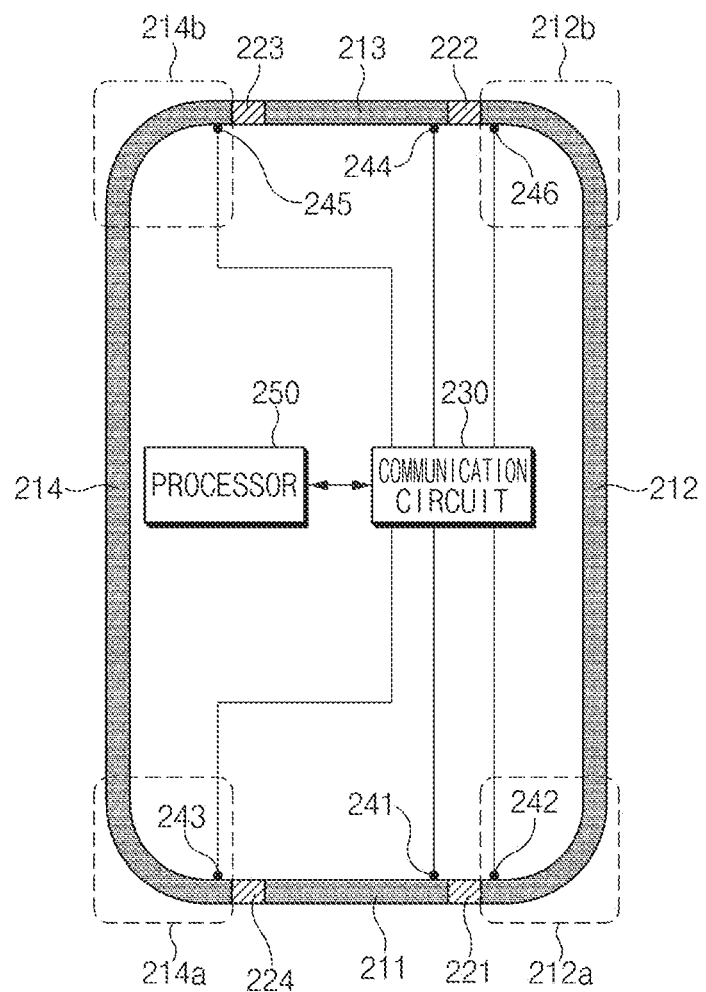
FIG. 2 illustrates conductive parts included in an electronic device according to an embodiment of the disclosure.

FIG. 2 illustrates conductive parts included in an electronic device according to an embodiment of the disclosure.

Referring to FIG. 2, an electronic device 200 (e.g., the electronic device 101 of FIG. 1) according to an embodiment may include a plurality of conductive parts 211, 212, 213, and 214, a plurality of non-conductive parts 221, 222, 223, and 224, a communication circuit 230, and a processor 250 (e.g., at least one processor).

According to an embodiment, the first conductive part 211 may be positioned on a first side of the electronic device 200. The first conductive part 211 may be used as, for example, a radiator of a first main antenna of the electronic device 200.

According to an embodiment, the second conductive part 212 may be positioned on a second side of the electronic device 200 that is adjacent to the first side. One end of the second conductive part 212 may be disposed adjacent to one end of the first conductive part 211. A first portion 212a of the second conductive part 212 may be used as, for example, a radiator of a second main antenna of the electronic device 200. A second portion 212b of the second conductive part 212 may be used as, for example, a radiator of a third sub-antenna of the electronic device 200.

According to an embodiment, the third conductive part 213 may be positioned on a third side of the electronic device 200 that is parallel to the first side and adjacent to the second side. One end of the third conductive part 213 may be disposed adjacent to an opposite end of the second conductive part 212. The third conductive part 213 may be used as, for example, a radiator of a first sub-antenna of the electronic device 200.

According to an embodiment, the fourth conductive part 214 may be positioned on a fourth side of the electronic device 200 that is adjacent to the first side and the third side and parallel to the second side. One end of the fourth conductive part 214 may be disposed adjacent to an opposite end of the third conductive part 213. An opposite end of the fourth conductive part 214 may be disposed adjacent to an opposite end of the first conductive part 211. A first portion 214a of the fourth conductive part 214 may be used as, for example, a radiator of a third main antenna of the electronic device 200. A second portion 214b of the fourth conductive part 214 may be used as, for example, a radiator of a second sub-antenna of the electronic device 200.

In this disclosure, the main antennas may be antennas that perform transmission and reception of signals, and the sub-antennas may be antennas that perform only reception of signals.

According to an embodiment, the first non-conductive part 221 may be interposed between the first conductive part 211 and the second conductive part 212. The second non-conductive part 222 may be interposed between the second conductive part 212 and the third conductive part 213. The third non-conductive part 223 may be interposed between the third conductive part 213 and the fourth conductive part 214. The fourth non-conductive part 224 may be interposed between the fourth conductive part 214 and the first conductive part 211.

Hereinafter, for the convenience of description, the first conductive part 211 may be referred to as the first main antenna radiator, the first portion 212a of the second conductive part 212 may be referred to as the second main antenna radiator, the first portion 214a of the fourth conductive part 214 may be referred to as the third main antenna radiator, the third conductive part 213 may be referred to as the first sub-antenna radiator, the second portion 214b of the fourth conductive part 214 may be referred to as the second sub-antenna radiator, and the second portion 212b of the second conductive part 212 may be referred to as the third sub-antenna radiator.

According to an embodiment, the communication circuit 230 may be positioned inside a housing of the electronic device 200. The communication circuit 230 may be a circuit configured to perform wireless communication. Although the communication circuit 230 is illustrated in FIG. 2 as a single block, the communication circuit 230 is not limited thereto and may include one or more modules.

According to an embodiment, the communication circuit 230 may be electrically connected with a first point 241 in the first main antenna radiator 211 that is close to the first non-conductive part 221. The communication circuit 230 may supply electric power to the first main antenna radiator 211 through the first point 241.

According to an embodiment, the communication circuit 230 may be electrically connected with a second point 242 in the second main antenna radiator 212a that is close to the first non-conductive part 221. The communication circuit 230 may supply electric power to the second main antenna radiator 212a through the second point 242.

According to an embodiment, the communication circuit 230 may be electrically connected with a third point 243 in the third main antenna radiator 214a that is close to the fourth non-conductive part 224. The communication circuit 230 may supply electric power to the third main antenna radiator 214a through the third point 243.

According to an embodiment, the communication circuit 230 may be electrically connected with a fourth point 244 in the first sub-antenna radiator 213. The communication circuit 230 may supply electric power to the first sub-antenna radiator 213 through the fourth point 244.

According to an embodiment, the communication circuit 230 may be electrically connected with a fifth point 245 in the second sub-antenna radiator 214b that is close to the third non-conductive part 223. The communication circuit 230 may supply electric power to the second sub-antenna radiator 214b through the fifth point 245.

According to an embodiment, the communication circuit 230 may be electrically connected with a sixth point 246 in the third sub-antenna radiator 212b that is close to the second non-conductive part 222. The communication circuit 230 may supply electric power to the third sub-antenna radiator 212b through the sixth point 246.

According to an embodiment, the communication circuit 230 may transmit and receive cellular signals that include a high-band (HB) signal, a mid-band (MB) signal having a frequency lower than the frequency of the HB signal, and a low-band (LB) signal having a frequency lower than the frequency of the MB signal. The communication circuit 230 may transmit and receive the cellular signals by using at least some of, for example, the first main antenna radiator 211, the second main antenna radiator 212a, the third main antenna radiator 214a, the first sub-antenna radiator 213, the second sub-antenna radiator 214b, and the third sub-antenna radiator 212b.

TABLE 1

| | Main 3 | | Main 1 | | Main 2 | | Sub 2 | Sub 1 | Sub 3 |
|---|---|---|---|---|---|---|---|---|---|
| | Tx | Rx | Tx | Rx | Tx | Rx | Rx | Rx | Rx |
| #1 | HB | MB/HB | LB | LB | MB | MB/HB | GPS/MB/HB | LB/MB | HB |
| #2 | MB | MB/HB | LB | LB | MB | MB/HB | GPS/MB/HB | LB/MB | HB |
| #3 | HB | MB/HB | LB/MB1-1 | LB/MB1-1 | MB1-2 | MB1-2/HB | GPS/MB/HB | LB/MB | HB |
| #4 | MB1-2/HB | MB/HB | LB | LB | MB1-1 | MB1-1/HB | GPS/MB/HB | LB/MB | HB |
| #5 | HB1-2 | MB/HB1-2 | LB/HB1-1 | LB/HB1-1 | MB | MB/HB | GPS/MB/HB | LB/MB | HB |
| #6 | HB1-2 | MB/HB1-2 | LB | LB | MB/HB1-1 | MB/HB | GPS/MB/HB | LB/MB | HB |

Table 1 lists bands of signals transmitted or received by the six antennas included in the electronic device 200 according to various embodiments. The electronic device 200 may transmit and receive signals by using the first main antenna radiator 211, the second main antenna radiator 212a, and the third main antenna radiator 214a. The electronic device 200 may receive signals by using the first sub-antenna radiator 213, the second sub-antenna radiator 214b, and the third sub-antenna radiator 212b.

In this disclosure, HB signals may be within a frequency range of about 2200 MHz to about 3500 MHz. MB signals may be within a frequency range of about 1700 MHz to about 2200 MHz. LB signals may be within a frequency range of about 700 MHz to about 1000 MHz. In this disclosure, MB1-1 Tx signals may be within a frequency range of about 1710 MHz to about 1780 MHz. MB1-1 Rx signals may be within a frequency range of about 2110 MHz to about 2200 MHz. In this disclosure, MB1-2 Tx signals may be within a frequency range of about 1850 MHz to about 1910 MHz. MB1-2 Rx signals may be within a frequency range of about 1930 MHz to about 1990 MHz. In this disclosure, HB1-1 Tx signals may be within a frequency range of about 2305 MHz to about 2315 MHz. HB1-1 Rx signals may be within a frequency range of about 2350 MHz to about 2360 MHz. In this disclosure, HB1-2 Tx signals may be within a frequency range of about 2500 MHz to about 2570 MHz. HB1-2 Rx signals may be within a frequency range of about 2620 MHz to about 2690 MHz. The above-described frequency ranges are merely illustrative, and the disclosure is not limited thereto.

According to an embodiment, the communication circuit 230 may receive MB signals through the second point 242, the third point 243, the fourth point 244, and the fifth point 245. The communication circuit 230 may receive LB signals through the first point 241 and the fourth point 244 and may transmit LB signals through the first point 241. For example, the communication circuit 230 may receive MB signals (MB signals, MB1-1 signals, or MB1-2 signals) by using the second main antenna radiator 212a, the third main antenna radiator 214a, the first sub-antenna radiator 213, and the second sub-antenna radiator 214b. For example, the communication circuit 230 may receive LB signals by using the first main antenna radiator 211 and the first sub-antenna radiator 213 and may transmit LB signals by using the first main antenna radiator 211 (#1 to #6).

According to an embodiment, the communication circuit 230 may transmit MB signals through the second point 242. The communication circuit 230 may receive HB signals through the second point 242, the third point 243, the fifth point 245, and the sixth point 246 and may transmit HB signals through the third point 243. For example, the communication circuit 230 may transmit MB signals by using the second main antenna radiator 212a. The communication circuit 230 may receive HB signals by using the second main antenna radiator 212a, the third main antenna radiator 214a, the second sub-antenna radiator 214b, and the third sub-antenna radiator 212b. The communication circuit 230 may transmit HB signals through the third main antenna radiator 214a (#1).

According to an embodiment, the communication circuit 230 may transmit MB signals through the third point 243. The communication circuit 230 may receive HB signals through the second point 242, the third point 243, the fifth point 245, and the sixth point 246 and may transmit HB signals through the second point 242. For example, the communication circuit 230 may transmit MB signals through the third main antenna radiator 214a. The communication circuit 230 may receive HB signals by using the second main antenna radiator 212a, the third main antenna radiator 214a, the second sub-antenna radiator 214b, and the third sub-antenna radiator 212b. The communication circuit 230 may transmit HB signals by using the second main antenna radiator 212a (#2).

According to an embodiment, the communication circuit 230 may receive MB signals through the first point 241 and may transmit MB signals through the first point 241 and the second point 242. The communication circuit 230 may receive HB signals through the second point 242, the third point 243, the fifth point 245, and the sixth point 246 and may transmit HB signals through the third point 243. For example, the communication circuit 230 may transmit and receive MB1-1 signals by using the first main antenna radiator 211. The communication circuit 230 may transmit and receive MB1-2 signals by using the second main antenna radiator 212a. The communication circuit 230 may receive HB signals by using the second main antenna radiator 212a, the third main antenna radiator 214a, the second sub-antenna radiator 214b, and the third sub-antenna radiator 212*b*. The communication circuit 230 may transmit HB signals by using the third main antenna radiator 214*a* (#3).

According to an embodiment, the communication circuit 230 may transmit MB signals through the second point 242 and the third point 243. The communication circuit 230 may receive HB signals through the second point 242, the third point 243, the fifth point 245, and the sixth point 246 and may transmit HB signals through the third point 243. For example, the communication circuit 230 may transmit and receive MB1-1 signals by using the second main antenna radiator 212*a*. The communication circuit 230 may transmit MB1-2 signals and receive MB signals by using the third main antenna radiator 214*a*. The communication circuit 230 may receive HB signals by using the second main antenna radiator 212*a*, the third main antenna radiator 214*a*, the second sub-antenna radiator 214*b*, and the third sub-antenna radiator 212*b*. The communication circuit 230 may transmit HB signals by using the third main antenna radiator 214*a* (#4).

According to an embodiment, the communication circuit 230 may receive HB signals through the first point 241, the second point 242, the third point 243, the fifth point 245, and the sixth point 246 and may transmit HB signals through the first point 241 and the third point 243. For example, the communication circuit 230 may transmit and receive HB1-1 signals by using the first main antenna radiator 211. The communication circuit 230 may transmit and receive HB1-2 signals by using the third main antenna radiator 214*a*. The communication circuit 230 may receive HB signals by using the second main antenna radiator 212*a*, the second sub-antenna radiator 214*b*, and the third sub-antenna radiator 212*b* (#5).

According to an embodiment, the communication circuit 230 may receive HB signals through the second point 242, the third point 243, the fifth point 245, and the sixth point 246 and may transmit HB signals through the second point 242 and the third point 243. For example, the communication circuit 230 may transmit HB1-1 signals and receive HB signals by using the second main antenna radiator 212*a*. The communication circuit 230 may transmit and receive HB1-2 signals by using the third main antenna radiator 214*a*. The communication circuit 230 may receive HB signals by using the second sub-antenna radiator 214*b* and the third sub-antenna radiator 212*b* (#6).

Frequency bands may be allocated to the respective antenna radiators in various forms not being listed in Table 1. However, as described above, the frequency band covered by the first main antenna radiator 211 may differ from the frequency band covered by the second main antenna radiator 212*a*. Furthermore, the frequency band covered by the first main antenna radiator 211 may differ from the frequency band covered by the third main antenna radiator 214*a*. Also, the frequency band of signals transmitted by the second main antenna radiator 212*a* may differ from the frequency band of signals transmitted by the third main antenna radiator 214*a*. Accordingly, 4Rx for MB signals and HB signals may be implemented.

According to an embodiment, the plurality of antenna radiators included in the electronic device 200 may be configured to cover LTE bands as follows. The first main antenna radiator 211 may be configured to cover, for example, LTE B12, B17, B13, B5, B26, B2, B4, B66, B25, CDMA BC0, BC10, and BC1. The second main antenna radiator 212*a* may be configured to cover, for example, LTE B30 and B41. The third main antenna radiator 214*a* may be configured to cover, for example, LTE B2, B4, B66, and B30. The first sub-antenna radiator 213 may be configured to cover, for example, LTE B12, B17, B13, B5, B26, B2, B4, B66, B25, CDMA BC0, and BC10. The second sub-antenna radiator 214*b* may be configured to cover, for example, LTE B2, B4, B66, B25, B30, and B41. The third sub-antenna radiator 212*b* may be configured to cover, for example, B30.

According to an embodiment, the processor 250 may be positioned inside the housing of the electronic device 200. The processor 250 may be electrically connected with the communication circuit 230. The processor 250 may control the communication circuit 230 and other elements of the electronic device 200.

As described above, for 4Rx, the electronic device 200 may use two main antenna radiators and two sub-antenna radiators. In the case of the sub-antenna radiators, even though a gain is low, a problem caused by the low gain may be solved by employing a separate low noise amplifier (LNA). Since a separate LNA cannot be employed for the main antenna radiators that perform transmission of signals, the two main antenna radiators need to be sufficiently electrically isolated from each other to increase gain.

Figure 3:
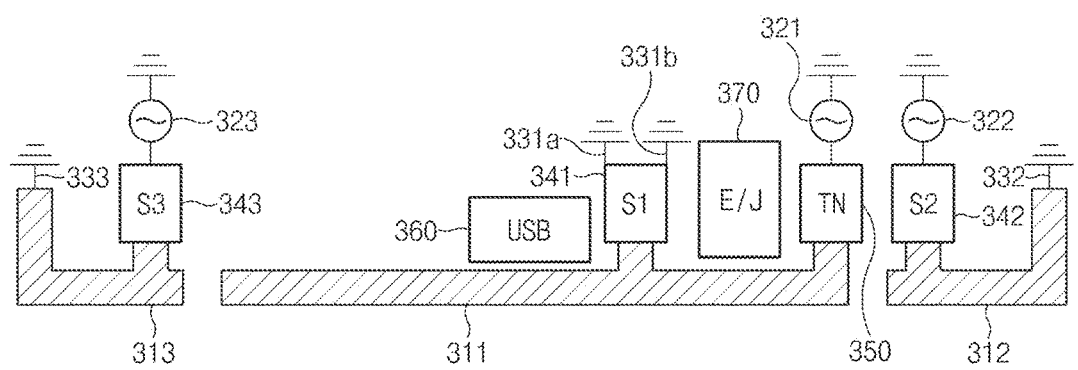
FIG. 3 schematically illustrates a structure of an antenna included in an electronic device according to an embodiment of the disclosure.

FIG. 3 schematically illustrates a structure of an antenna included in an electronic device according to an embodiment of the disclosure.

Referring to FIG. 3, an electronic device (e.g., the electronic device 200 of FIG. 2) according to an embodiment may include a first antenna radiator 311, a second antenna radiator 312, a third antenna radiator 313, a first feeding part 321, a second feeding part 322, a third feeding part 323, a first ground part 331*a*, a second ground part 331*b*, a third ground part 332, a fourth ground part 333, a first switching circuit 341, a second switching circuit 342, a third switching circuit 343, a tunable circuit 350, a USB port 360, and an ear jack 370. The first antenna radiator 311, the second antenna radiator 312, and the third antenna radiator 313 may correspond to the first main antenna radiator 211, the second main antenna radiator 212*a*, and the third main antenna radiator 214*a* of FIG. 2, respectively.

According to an embodiment, the first antenna radiator 311 may be configured to resonate in a first band. The first antenna radiator 311 may be disposed in the middle of one end of the electronic device. The first antenna radiator 311 may have a shape elongated leftwards and rightwards.

According to an embodiment, the second antenna radiator 312 may be configured to resonate in second and third bands higher than the first band. For isolation from the first antenna radiator 311, the second antenna radiator 312 may support a different frequency band than the first antenna radiator 311. The second antenna radiator 312 may be spaced apart from the first antenna radiator 311. One end of the second antenna radiator 312 may be disposed adjacent to one end of the first antenna radiator 311.

According to an embodiment, the third antenna radiator 313 may be configured to resonate in the second and third bands. For isolation from the first antenna radiator 311, the third antenna radiator 313 may support a different frequency band than the first antenna radiator 311. The third antenna radiator 313 may be spaced apart from the first antenna radiator 311 and the second antenna radiator 312. For example, one end of the third antenna radiator 313 may be disposed adjacent to an opposite end of the first antenna radiator 311.

According to an embodiment, the first feeding part 321 may electrically connect a communication circuit (e.g., the communication circuit 230 of FIG. 2) and the first antenna radiator 311. For example, the first feeding part 321 may be electrically connected with a flange of the first antenna radiator 311 that is adjacent to the one end of the first antenna radiator 311.

According to an embodiment, the first feeding part 321 may be electrically connected with the first antenna radiator 311 through the tunable circuit 350. The tunable circuit 350 may include a lumped element, which may be, for example, a capacitor and/or an inductor. An impedance value of the tunable circuit 350 may be tuned. The resonant frequency of the first antenna radiator 311 may be adjusted by tuning the tunable circuit 350. The tuning of the tunable circuit 350 may have an influence on the second antenna radiator 312 and/or the third antenna radiator 313.

According to an embodiment, the second feeding part 322 may electrically connect the communication circuit and the second antenna radiator 312. For example, the second feeding part 322 may be electrically connected with a flange of the second antenna radiator 312 that is adjacent to the one end of the second antenna radiator 312.

According to an embodiment, the second feeding part 322 may be electrically connected with the second antenna radiator 312 through the second switching circuit 342. The resonant frequency of the second antenna radiator 312 may be adjusted by an operation of the second switching circuit 342. The operation of the second switching circuit 342 may have an influence on the first antenna radiator 311 and/or the third antenna radiator 313. The second switching circuit 342 will be described below in detail with reference to FIGS. 9 and 10.

According to an embodiment, the third feeding part 323 may electrically connect the communication circuit and the third antenna radiator 313. For example, the third feeding part 323 may be electrically connected with a flange of the third antenna radiator 313 that is adjacent to the one end of the third antenna radiator 313.

According to an embodiment, the third feeding part 323 may be electrically connected with the third antenna radiator 313 through the third switching circuit 343. The resonant frequency of the third antenna radiator 313 may be adjusted by an operation of the third switching circuit 343. The operation of the third switching circuit 343 may have an influence on the first antenna radiator 311 and/or the second antenna radiator 312. The third switching circuit 343 will be described below in detail with reference to FIGS. 9 and 10.

According to an embodiment, the first ground part 331a or the second ground part 331b may be electrically connected with the first antenna radiator 311. The first ground part 331a or the second ground part 331b may be electrically connected with a flange of the first antenna radiator 311 that extends from a point of the first antenna radiator 311. The first ground part 331a or the second ground part 331b may be electrically connected with the first antenna radiator 311 through the first switching circuit 341. The first switching circuit 341 may selectively connect the first ground part 331a or the second ground part 331b with the first antenna radiator 311. The first switching circuit 341 may include, for example, one or more lumped elements. The resonant frequency of the first antenna radiator 311 may be adjusted by an operation of the first switching circuit 341. The operation of the first switching circuit 341 may have an influence on the second antenna radiator 312 and/or the third antenna radiator 313.

According to an embodiment, the third ground part 332 may be electrically connected with the second antenna radiator 312. For example, the third ground part 332 may be electrically connected with an opposite end of the second antenna radiator 312.

According to an embodiment, the fourth ground part 333 may be electrically connected with the third antenna radiator 313. For example, the fourth ground part 333 may be electrically connected with an opposite end of the third antenna radiator 313.

According to an embodiment, the USB port 360 may be disposed adjacent to a central portion of the first antenna radiator 311. The USB port 360 may be exposed through, for example, an opening formed in the central portion of the first antenna radiator 311.

According to an embodiment, the ear jack 370 may be disposed between the first ground part 331a or the second ground part 331b and the first feeding part 321. The ear jack 370 may be exposed through, for example, an opening formed in the first antenna radiator 311.

According to an embodiment, the first antenna radiator 311, the first feeding part 321, and the first ground part 331a, or the first antenna radiator 311, the first feeding part 321, and the second ground part 331b, may constitute an inverted F antenna (IFA). According to an embodiment, the second antenna radiator 312, the second feeding part 322, and the third ground part 332 may constitute a loop antenna or an IFA. According to an embodiment, the third antenna radiator 313, the third feeding part 323, and the fourth ground part 333 may constitute a loop antenna, an IFA, or a monopole antenna.

According to an embodiment, the communication circuit may receive signals of the second band by using the third antenna radiator 313 while transmitting and receiving signals of the second band by using the second antenna radiator 312. For example, the communication circuit may receive MB signals by using the third antenna radiator 313 while transmitting and receiving MB signals by using the second antenna radiator 312. In this case, the communication circuit may transmit and receive LB signals by using the first antenna radiator 311. Since the first antenna radiator 311 covers a different frequency band than the second antenna radiator 312 and the third antenna radiator 313 that are adjacent to the first antenna radiator 311, the first antenna radiator 311 and the second antenna radiator 312, and the first antenna radiator 311 and the third antenna radiator 313 may be electrically isolated from each other. In another example, the second antenna radiator 312 and the third antenna radiator 313 may be sufficiently electrically isolated from each other due to the distance between the second antenna radiator 312 and the third antenna radiator 313.

According to an embodiment, the communication circuit may receive signals of the third band by using the second antenna radiator 312 while transmitting and receiving signals of the third band by using the third antenna radiator 313. For example, the communication circuit may receive HB signals by using the second antenna radiator 312 while transmitting and receiving HB signals by using the third antenna radiator 313. In this case, the communication circuit may transmit and receive LB signals by using the first antenna radiator 311.

Figure 4:
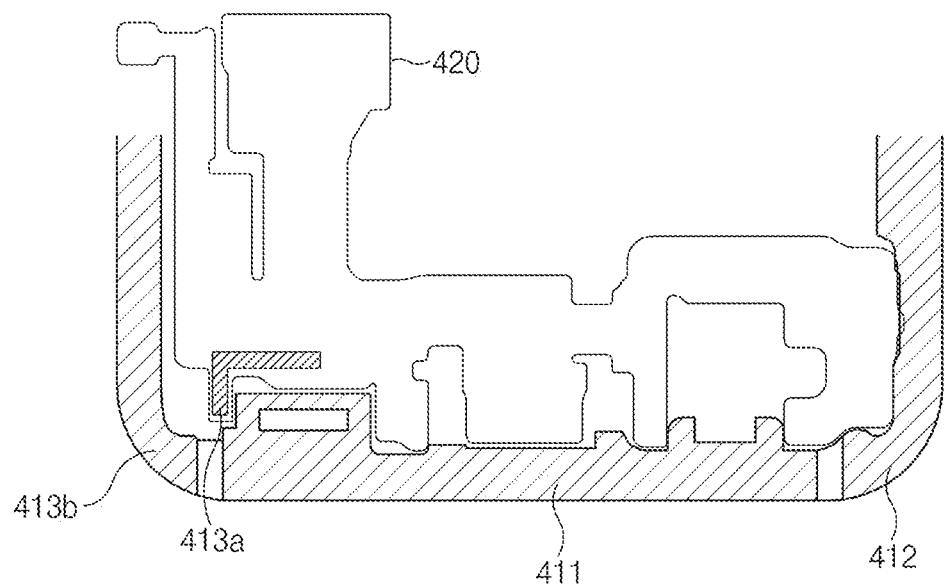
FIG. 4 illustrates a lower inner structure of an electronic device according to an embodiment of the disclosure.

FIG. 4 illustrates a lower inner structure of an electronic device according to an embodiment of the disclosure.

Referring to FIG. 4, an electronic device (e.g., the electronic device 200 of FIG. 2) according to an embodiment may include a first frame 411, a second frame 412, a third frame 413b, a conductive pattern 413a, and a printed circuit board (PCB) 420. A conductive part of the first frame 411 may correspond to the first antenna radiator 311 of FIG. 3. A conductive part of the second frame 412 may correspond to the second antenna radiator 312 of FIG. 3. A conductive part of the third frame 413b and/or the conductive pattern 413a may correspond to the third antenna radiator 313 of FIG. 3.

According to an embodiment, the first frame 411 may be positioned in the middle of a lower end of the electronic device. The first frame 411 may be, for example, a part of a lateral frame of the electronic device. The first frame 411 may contain a conductive material.

According to an embodiment, the second frame 412 may be disposed adjacent to one end of the first frame 411. The second frame 412 may be, for example, a part of the lateral frame of the electronic device. The second frame 412 may contain a conductive material.

According to an embodiment, the third frame 413b may be disposed adjacent to an opposite end of the first frame 411. The third frame 413b may be, for example, a part of the lateral frame of the electronic device. The third frame 413b may contain a conductive material.

According to an embodiment, the conductive pattern 413a may be disposed on the PCB 420. For example, the conductive pattern 413a may be printed on an area of the PCB 420 that is adjacent to the third frame 413b. The conductive pattern 413a may be, for example, an optional element and may be omitted according to an implemented embodiment of the disclosure.

According to an embodiment, the third frame 413b and/or the conductive pattern 413a may be used as an antenna radiator. For example, the third frame 413b may be used as an antenna radiator, and the conductive pattern 413a may be omitted. In another example, the conductive pattern 413a may be used as an antenna radiator. In another example, the conductive pattern 413a may be electrically connected with the third frame 413b, and the conductive pattern 413a and the third frame 413b may be used as an antenna radiator.

Figure 5:
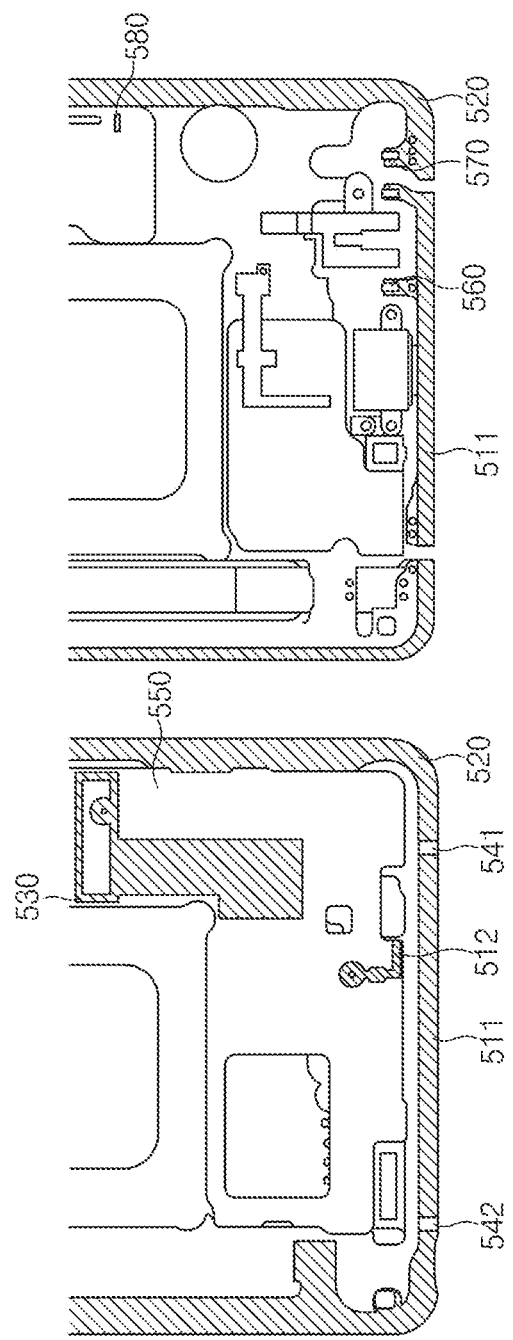
FIG. 5 illustrates a lower inner structure of an electronic device according to an embodiment of the disclosure.

FIG. 5 illustrates a lower inner structure of an electronic device according to an embodiment of the disclosure.

Referring to FIG. 5, an electronic device according to an embodiment may include a first frame 511, a first conductive pattern 512, a second frame 520, a second conductive pattern 530, a first non-conductive member 541, a second non-conductive member 542, and a PCB 550. A conductive part of the first frame 511 and the first conductive pattern 512 may correspond to the first antenna radiator 311 of FIG. 3. A conductive part of the second frame 520 may correspond to the second antenna radiator 312 of FIG. 3. The second conductive pattern 530 may correspond to the third antenna radiator 313 of FIG. 3.

According to an embodiment, the first frame 511 may be positioned in the middle of a lower end of the electronic device. The first frame 511 may be, for example, a part of a lateral frame of the electronic device. The first conductive pattern 512 may be printed on an area of the PCB 550 that is adjacent to the first frame 511. The first frame 511 may be electrically connected with the first conductive pattern 512. The first frame 511 and the first conductive pattern 512 may be used as an antenna radiator of the electronic device. The first frame 511 and the first conductive pattern 512 may cover, for example, an LB and an MB.

According to an embodiment, the second frame 520 may be disposed adjacent to one end of the first frame 511. The second frame 520 may be, for example, a part of the lateral frame of the electronic device. The second frame 520 may be used as an antenna radiator of the electronic device. The second frame 520 may cover, for example, an MB and an HB.

According to an embodiment, the first non-conductive member 541 may be disposed to make contact with the one end of the first frame 511. The first non-conductive member 541 may be interposed between the first frame 511 and the second frame 520.

According to an embodiment, the second non-conductive member 542 may be disposed to make contact with an opposite end of the first frame 511. The second non-conductive member 542 may be interposed between the first frame 511 and another part of the lateral frame.

According to an embodiment, the second conductive pattern 530 may be disposed on the PCB 550. For example, the second conductive pattern 530 may be printed on an area of the PCB 550 that is spaced apart from the first frame 511 and the second frame 520 by a predetermined distance or more. The second conductive pattern 530 may be used as an antenna radiator of the electronic device. The second conductive pattern 530 may cover, for example, an HB.

According to an embodiment, the first frame 511 and the first conductive pattern 512 may receive electric power through, for example, a first point 560. The first frame 511 and the first conductive pattern 512 may be electrically connected with a communication circuit (e.g., the communication circuit 230 of FIG. 2) through the first point 560. The second frame 570 may receive electric power through, for example, a second point 570. The second frame 520 may be electrically connected with the communication circuit through the second point 570. The second conductive pattern 530 may receive electric power through, for example, a third point 580. The second conductive pattern 530 may be electrically connected with the communication circuit through the third point 580.

Figure 6:
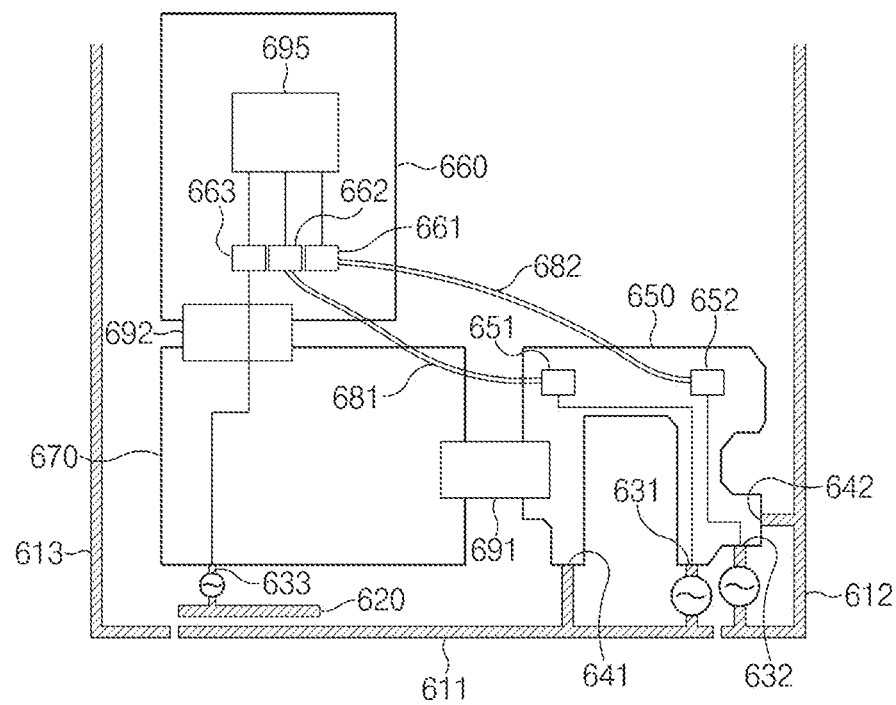
FIG. 6 schematically illustrates a structure of an electronic device according to an embodiment of the disclosure.

FIG. 6 schematically illustrates a structure of an electronic device according to an embodiment of the disclosure.

Referring to FIG. 6, an electronic device (e.g., the electronic device 200 of FIG. 2) according to an embodiment may include a first frame 611, a second frame 612, a third frame 613, a conductive pattern 620, a first feeding point 631, a second feeding point 632, a third feeding point 633, a first ground point 641, a second ground point 642, a first PCB 650, a first receptacle 651, a second receptacle 652, a second PCB 660, a third receptacle 661, a fourth receptacle 662, a fifth receptacle 663, a third PCB 670, a first transmission line 681, a second transmission line 682, a first FPCB 691, a second FPCB 692, and a communication circuit 695.

According to an embodiment, the first frame 611, the second frame 612, the third frame 613, and the conductive pattern 620 may correspond to the first frame 411, the second frame 412, the third frame 413b, and the conductive pattern 413a of FIG. 4, respectively.

According to an embodiment, the first PCB 650 may include the first receptacle 651 and the second receptacle 652. The first receptacle 651 may be configured to accommodate the first transmission line 681. The second receptacle 652 may be configured to accommodate the second transmission line 682. The first receptacle 651 may be electrically connected with the first feeding point 631. The second receptacle 652 may be electrically connected with the second feeding point 632.

According to an embodiment, the second PCB 660 may include the third receptacle 661, the fourth receptacle 662, and the fifth receptacle 663. The third receptacle 661 may be configured to accommodate the second transmission line 682. The fourth receptacle 662 may be configured to accommodate the first transmission line 681. The fifth receptacle 663 may be electrically connected with the third feeding point 633 through the second FPCB 692 and the third PCB 670. The third receptacle 661, the fourth receptacle 662, and the fifth receptacle 663 may be electrically connected with the communication circuit 695. In FIG. 6, the second PCB 660 is illustrated as including the three receptacles 661, 662, and 663. Without being limited thereto, however, at least some of the third receptacle 661, the fourth receptacle 662, and the fifth receptacle 663 may be combined to form one receptacle.

According to an embodiment, the third PCB 670 may be connected with the first PCB 650 through the first FPCB 691 and may be connected with the second PCB 660 through the second FPCB 692.

In FIG. 6, the electronic device is illustrated as including the three PCBs 650, 660, and 670 connected together through the two FPCBs 691 and 692. Without being limited thereto, however, at least some of the first PCB 650, the second PCB 660, and the third PCB 670 may be combined to form one PCB.

According to an embodiment, the first frame 611 may receive electric power through the first feeding point 631. The first frame 611 may be electrically connected with the communication circuit 695 through the first feeding point 631. For example, the first frame 611 may be electrically connected with the communication circuit 695 through the first feeding point 631, the first receptacle 651, the first transmission line 681, and the fourth receptacle 662. The first frame 611 may be grounded through the first ground point 641. The first frame 611 may be used as a radiator of an IFA.

According to an embodiment, the second frame 612 may receive electric power through the second feeding point 632. The second frame 612 may be electrically connected with the communication circuit 695 through the second feeding point 632. For example, the second frame 612 may be electrically connected with the communication circuit 695 through the second feeding point 632, the second receptacle 652, the second transmission line 682, and the third receptacle 661. The second frame 612 may be grounded through the second ground point 642. The second frame 612 may be used as a radiator of an IFA or a loop antenna.

According to an embodiment, the conductive pattern 620 may receive electric power through the third feeding point 633. The third frame 613 may be electrically connected with the communication circuit 695 through the third feeding point 633. For example, the third frame 613 may be electrically connected with the communication circuit 695 through the third feeding point 633 and the fifth receptacle 663. The third frame 613 may be used as a radiator of a monopole antenna.

Figure 7:
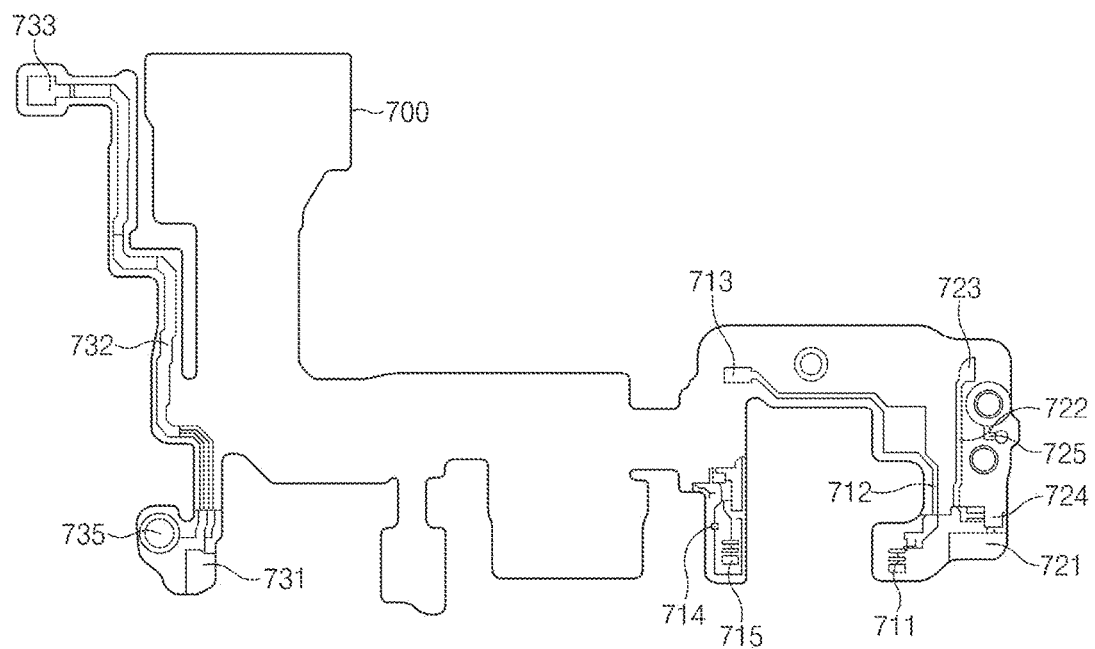
FIG. 7 illustrates a printed circuit board (PCB) included in an electronic device according to an embodiment of the disclosure.

FIG. 7 illustrates a printed circuit board included in an electronic device according to an embodiment of the disclosure.

Referring to FIG. 7, a printed circuit board (PCB) 700 of an electronic device according to an embodiment may include a first feeding point 711, a first feeding line 712, a first connector 713, a first switching circuit 714, a first ground point 715, a second feeding point 721, a second feeding line 722, a second connector 723, a second switching circuit 724, a second ground point 725, a third feeding point 731, a third feeding line 732, a third connector 733, and a third ground point 735.

According to an embodiment, the first feeding point 711 may be electrically connected with a point of a first antenna radiator (e.g., the first antenna radiator 311 of FIG. 3). The first feeding point 711 may be electrically connected with the first connector 713 through the first feeding line 712. The first connector 713 may be electrically connected with a communication circuit (e.g., the communication circuit 695 of FIG. 6) through a cable (e.g., the first transmission line 681 of FIG. 6). The first ground point 715 may be electrically connected with another point of the first antenna radiator. The first ground point 715 may be electrically connected with the other point of the first antenna radiator through, for example, the first switching circuit 714 (e.g., the first switching circuit 341 of FIG. 3).

According to an embodiment, the second feeding point 721 may be electrically connected with a point of a second antenna radiator (e.g., the second antenna radiator 312 of FIG. 3). The second feeding point 721 may be electrically connected with the point of the second antenna radiator through, for example, the second switching circuit 724 (e.g., the second switching circuit 342 of FIG. 3). The second feeding point 721 may be electrically connected with the second connector 723 through the second feeding line 722. The second connector 723 may be electrically connected with the communication circuit through a cable (e.g., the second transmission line 682 of FIG. 6). The second ground point 725 may be electrically connected with another point of the second antenna radiator.

According to an embodiment, the first feeding point 711 may be adjacent to the second feeding point 721. The first feeding point 711 may be electrically connected with a point of the first antenna radiator that is adjacent to the second antenna radiator. The second feeding point 721 may be electrically connected with a point of the second antenna radiator that is adjacent to the first antenna radiator.

According to an embodiment, the third feeding point 731 may be electrically connected with a point of a third antenna radiator (e.g., the third antenna radiator 313 of FIG. 3). The third feeding point 731 may be electrically connected with the third connector 733 through the third feeding line 732. The third connector 733 may be electrically connected with the communication circuit through a cable. The third ground point 735 may be electrically connected with another point of the third antenna radiator.

Figure 8:
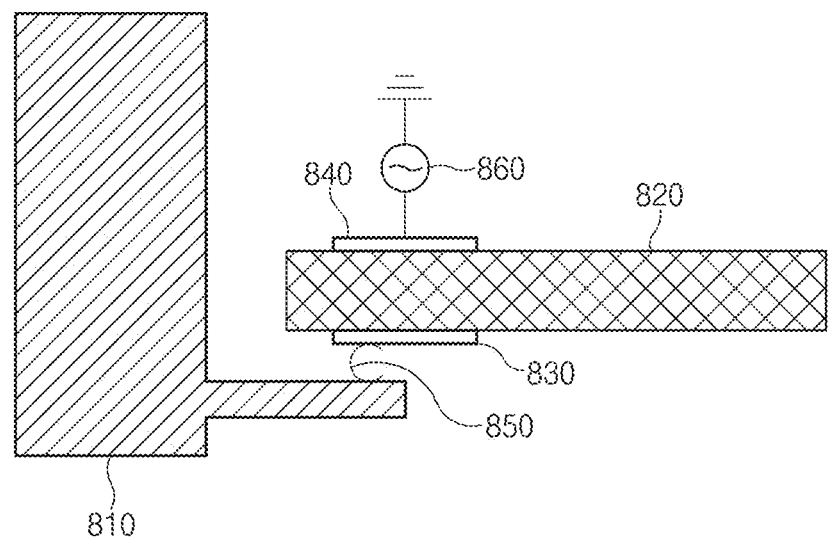
FIG. 8 schematically illustrates a coupling feeding structure employed in an electronic device according to an embodiment of the disclosure.

FIG. 8 schematically illustrates a coupling feeding structure employed in an electronic device according to an embodiment of the disclosure.

Referring to FIG. 8, an electronic device (e.g., the electronic device 200 of FIG. 2) according to an embodiment may include an antenna radiator 810, a printed circuit board (PCB) 820, a first conductive pad 830, a second conductive pad 840, a connecting member 850, and a feeding part 860.

The antenna radiator 810 may be one of, for example, the first antenna radiator 311, the second antenna radiator 312, and the third antenna radiator 313 of FIG. 3.

The PCB 820 may be disposed in a space formed by a lateral frame of the electronic device that includes the antenna radiator 810.

According to an embodiment, the first conductive pad 830 may be disposed on one surface of the PCB 820. The second conductive pad 840 may be spaced apart from, but electrically coupled with, the first conductive pad 830. The first conductive pad 830 and the second conductive pad 840 may function as a capacitor.

According to an embodiment, the connecting member 850 may connect the first conductive pad 830 with the antenna radiator 810. The connecting member 850 may be a conductive elastic member, such as a C-clip, a spring, a screw, conductive foam, or the like.

According to an embodiment, the feeding part 860 may be electrically connected with the second conductive pad 840. The feeding part 860 may electrically connect the second conductive pad 840 with a communication circuit (e.g., the communication circuit 695 of FIG. 6).

According to an embodiment, the antenna radiator 810 may be electrically connected with the communication circuit through the connecting member 850, the first conductive pad 830, the second conductive pad 840, and the feeding part 860. The antenna radiator 810 may receive electric power through the first conductive pad 830 and the second conductive pad 840 by coupling feeding. A frequency band supported by the antenna radiator 810 may be lowered due to capacitance formed by the first conductive pad 830 and the second conductive pad 840.

According to an embodiment, antenna radiators adjacent to each other may be further electrically isolated by supplying electric power to the adjacent antenna radiators by different feeding methods. For example, if the first frame 611 of FIG. 6 directly receives electric power and the second frame 612 receives electric power by coupling feeding, the first frame 611 and the second frame 612, which have feeding points adjacent to each other, may be further electrically isolated from each other.

Figure 9:
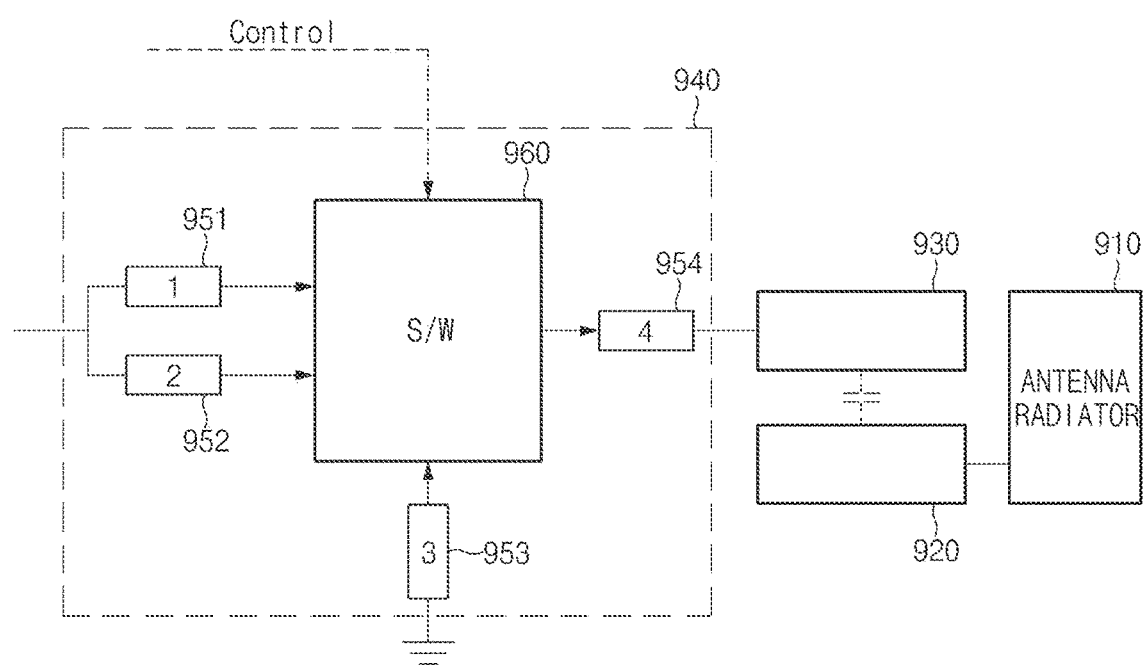
FIG. 9 schematically illustrates a switching circuit included in an electronic device according to an embodiment of the disclosure.

FIG. 9 schematically illustrates a switching circuit included in an electronic device according to an embodiment of the disclosure.

Referring to FIG. 9, an electronic device (e.g., the electronic device 200 of FIG. 2) according to an embodiment may include an antenna radiator 910, a first conductive pad 920, a second conductive pad 930, and a switching circuit 940. Although not illustrated in FIG. 9, the switching circuit 940 may be electrically connected with a communication circuit (e.g., the communication circuit 230 of FIG. 2).

According to an embodiment, the antenna radiator 910 may be electrically connected with the first conductive pad 920. The antenna radiator 910 may be connected with the first conductive pad 920 through, for example, a connecting member (e.g., the connecting member 850 of FIG. 8), such as a C-clip. The first conductive pad 920 may be electrically coupled with the second conductive pad 930.

According to an embodiment, the switching circuit 940 may correspond to at least a part of, for example, the first switching circuit 341, the second switching circuit 342, and the third switching circuit 343 of FIG. 3. The switching circuit 940 may include a first element 951, a second element 952, a third element 953, a fourth element 954, and a switch 960. Each of the first element 951, the second element 952, the third element 953, and the fourth element 954 may include one or more lumped elements. At least some of the first element 951, the second element 952, the third element 953, and the fourth element 954 may be a line having impedance close to zero. The first element 951 and the second element 952 may be electrically connected with the communication circuit. The third element 953 may be grounded. The fourth element 954 may be electrically connected with the second conductive pad 930. The first element 951, the second element 952, the third element 953, and the fourth element 954 may be electrically connected with the switch 960.

According to an embodiment, the switch 960 may be controlled by the communication circuit or a processor. For example, the switch 960 may connect the first element 951 and the fourth element 954. In another example, the switch 960 may connect the second element 952 and the fourth element 954. In another example, the switch 960 may interconnect the first element 951, the second element 952, and the fourth element 954. In another example, the switch 960 may interconnect the first element 951, the third element 953, and the fourth element 954. In another example, the switch 960 may interconnect the second element 952, the third element 953, and the fourth element 954. In another example, the switch 960 may interconnect the first element 951, the second element 952, the third element 953, and the fourth element 954.

The switch 960 may connect, for example, the third element 953 and the fourth element 954. In this case, the antenna radiator 910 may be grounded. The switch 960 may not be connected with any element. Various matching structures may be configured by the above-described operation of the switch 960.

Figure 10:
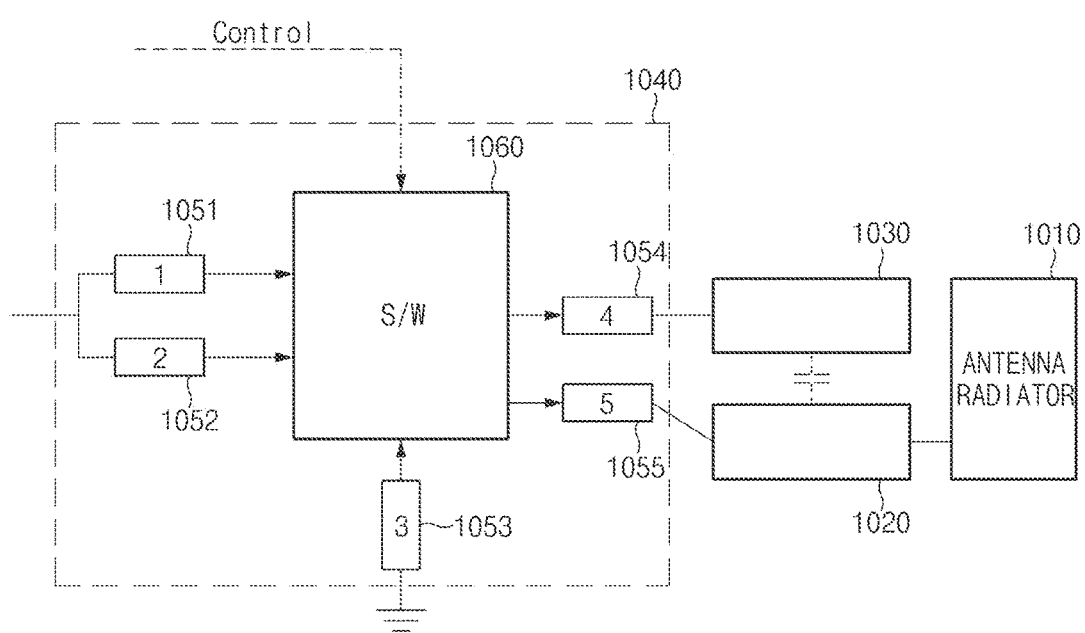
FIG. 10 schematically illustrates a switching circuit included in an electronic device according to an embodiment of the disclosure.

FIG. 10 schematically illustrates a switching circuit included in an electronic device according to an embodiment of the disclosure.

Referring to FIG. 10, an electronic device (e.g., the electronic device 200 of FIG. 2) according to an embodiment may include an antenna radiator 1010, a first conductive pad 1020, a second conductive pad 1030, and a switching circuit 1040. Although not illustrated in FIG. 10, the switching circuit 1040 may be electrically connected with a communication circuit (e.g., the communication circuit 230 of FIG. 2).

According to an embodiment, the antenna radiator 1010, the first conductive pad 1020, and the second conductive pad 1030 may correspond to the antenna radiator 910, the first conductive pad 920, and the second conductive pad 930 of FIG. 9, respectively.

According to an embodiment, the switching circuit 1040 may correspond to at least a part of, for example, the first switching circuit 341, the second switching circuit 342, and the third switching circuit 343 of FIG. 3. The switching circuit 1040 may include a first element 1051, a second element 1052, a third element 1053, a fourth element 1054, a fifth element 1055, and a switch 1060. The first element 1051, the second element 1052, the third element 1053, and the fourth element 1054 may correspond to the first element 951, the second element 952, the third element 953, and the fourth element 954 of FIG. 9, respectively. The fifth element 1055 may include one or more lumped elements and may be a line having impedance close to zero. The fifth element 1055 may be electrically connected with the first conductive pad 1020. For example, the fifth element 1055 may be electrically connected with the first conductive pad 1020 through a via formed in a printed circuit board (e.g., the printed circuit board (PCB) 820 of FIG. 8). The first element 1051, the second element 1052, the third element 1053, the fourth element 1054, and the fifth element 1055 may be electrically connected with the switch 1060.

According to an embodiment, the switch 1060 may be controlled by the communication circuit. According to an embodiment, the switch 1060 may selectively electrically connect the first conductive pad 1020 or the second conductive pad 1030 with the communication circuit.

According to an embodiment, the switch 1060 may electrically connect the first conductive pad 1020 with the communication circuit. In this case, the antenna radiator 1010 may directly receive electric power. For example, the switch 1060 may connect the first element 1051 and the fourth element 1054. In another example, the switch 1060 may connect the second element 1052 and the fourth element 1054. In another example, the switch 1060 may interconnect the first element 1051, the second element 1052, and the fourth element 1054. In another example, the switch 1060 may interconnect the first element 1051, the third element 1053, and the fourth element 1054. In another example, the switch 1060 may interconnect the second element 1052, the third element 1053, and the fourth element 1054. In another example, the switch 1060 may interconnect the first element 1051, the second element 1052, the third element 1053, and the fourth element 1054.

According to an embodiment, the switch 1060 may electrically connect the second conductive pad 1030 with the communication circuit. In this case, the antenna radiator 1010 may receive electric power by coupling feeding. For example, the switch 1060 may connect the first element 1051 and the fifth element 1055. In another example, the switch 1060 may connect the second element 1052 and the fifth element 1055. In another example, the switch 1060 may interconnect the first element 1051, the second element 1052, and the fifth element 1055. In another example, the switch 1060 may interconnect the first element 1051, the third element 1053, and the fifth element 1055. In another example, the switch 1060 may interconnect the second element 1052, the third element 1053, and the fifth element 1055. In another example, the switch 1060 may interconnect the first element 1051, the second element 1052, the third element 1053, and the fifth element 1055.

For example, the switch 1060 may connect the third element 1053 and the fourth element 1054 and may connect the third element 1053 and the fifth element 1055. In this case, the antenna radiator 1010 may be grounded. The switch 1060 may not be connected with any element.

Various matching structures may be configured by the above-described operation of the switch 1060. Furthermore, a feeding method for the antenna radiator 1010 may be selected.

Figure 11:
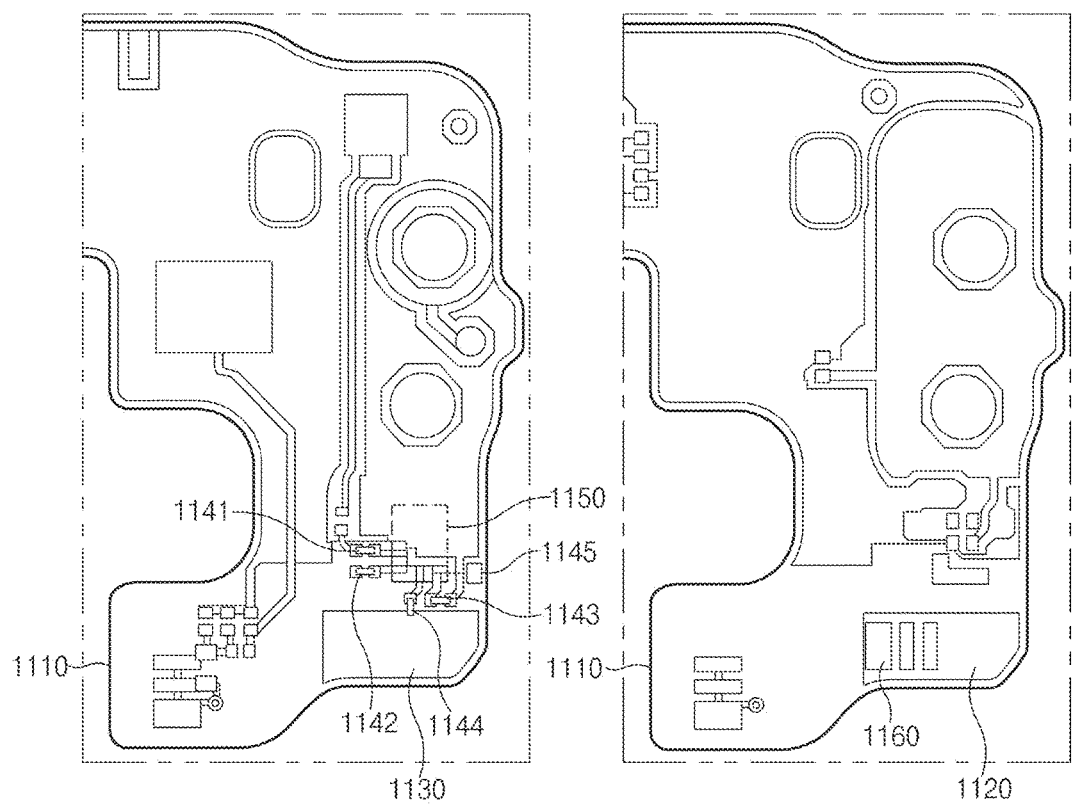
FIG. 11 illustrates a portion of a PCB included in an electronic device according to an embodiment of the disclosure.

FIG. 11 illustrates a portion of a printed circuit board included in an electronic device according to an embodiment of the disclosure. A left image of FIG. 11 illustrates one surface of the printed circuit board, and a right image of FIG. 11 illustrates an opposite surface of the printed circuit board.

Referring to FIG. 11, a second conductive pad 1130, a first element 1141, a second element 1142, a third element 1143, a fourth element 1144, a fifth element 1145, and a switch 1150 may be arranged on one surface of a printed circuit board (PCB) 1110 included in an electronic device (e.g., the electronic device 200 of FIG. 2) according to an embodiment. The first element 1141, the second element 1142, the third element 1143, the fourth element 1144, and the fifth element 1145 may be electrically connected with the switch 1150. The fourth element 1144 may be electrically connected with the second conductive pad 1130.

According to an embodiment, a first conductive pad 1120 and a connecting member 1160 may be arranged on an opposite surface of the PCB 1110. The first conductive pad 1120 may be electrically connected with the connecting member 1160. The connecting member 1160 may be electrically connected with an antenna radiator (e.g., the first antenna radiator 311, the second antenna radiator 312, or the third antenna radiator 313 of FIG. 3). The first conductive pad 1120 may be electrically coupled with the second conductive pad 1130. The first conductive pad 1120 may be electrically connected with the fifth element 1145 through a via formed in the PCB 1110.

According to an embodiment, the first conductive pad 1120, the second conductive pad 1130, the first element 1141, the second element 1142, the third element 1143, the fourth element 1144, the fifth element 1145, and the switch 1150 of FIG. 11 may correspond to the first conductive pad 1020, the second conductive pad 1030, the first element 1051, the second element 1052, the third element 1053, the fourth element 1054, the fifth element 1055, and the switch 1060 of FIG. 10, respectively.

Figure 12:
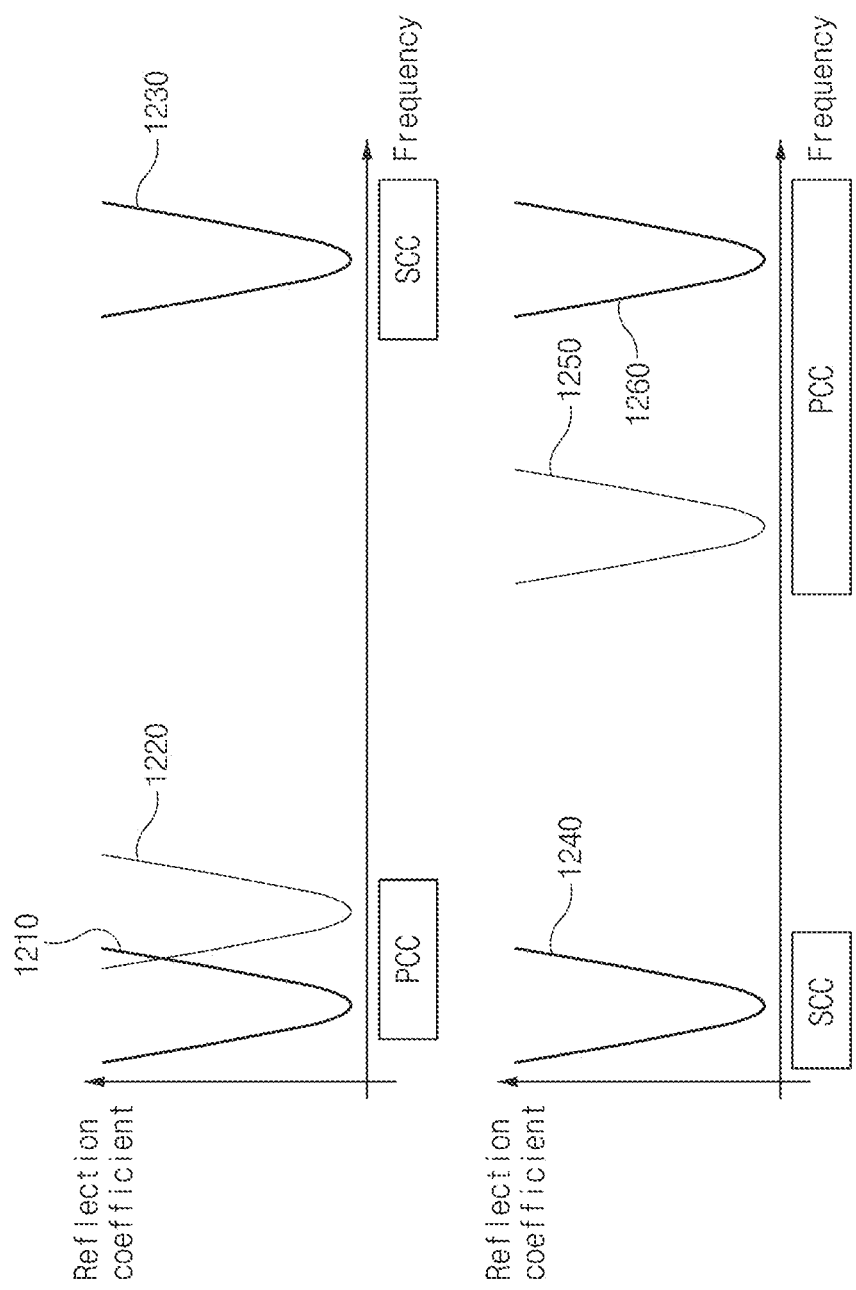
FIG. 12 illustrates frequency dependent reflection coefficients of antennas included in an electronic device according to an embodiment of the disclosure.

FIG. 12 illustrates frequency dependent reflection coefficients of antennas included in an electronic device according to an embodiment of the disclosure.

Referring to FIG. 12, a first curve 1210 and a second curve 1220 represent frequency dependent reflection coefficients of a first antenna radiator (e.g., the first antenna radiator 311 of FIG. 3). A third curve 1230 represents frequency dependent reflection coefficients of a third antenna radiator (e.g., the third antenna radiator 313 of FIG. 3). In this case, a second antenna radiator (e.g., the second antenna radiator 312 of FIG. 3) may be open.

According to an embodiment, an electronic device (e.g., the electronic device 200 of FIG. 2) may use LTE B13 as a primary component carrier (PCC) and may use LTE B4 as a secondary component carrier (SCC). As shown in the first curve 1210, the first antenna radiator may support B13 Rx. Also, as shown in the second curve 1220, the first antenna radiator may support B13 Tx. As shown in the third curve 1230, the third antenna radiator may support B4 Rx. The electronic device may aggregate B13, which is a PCC, and B4, which is an SCC.

According to an embodiment, a fourth curve 1240 represents frequency dependent reflection coefficients of the first antenna radiator. A fifth curve 1250 and a sixth curve 1260 represent frequency dependent reflection coefficients of the second antenna radiator. In this case, the third antenna radiator may be open.

According to an embodiment, the electronic device may use LTE B4 as a PCC and may use LTE B13 as an SCC. As shown in the fourth curve 1240, the first antenna radiator may support B13 Rx. Meanwhile, as shown in the fifth curve 1250, the second antenna radiator may support B4 Tx. Also, as shown in the sixth curve 1260, the second antenna radiator may support B4 Rx. The electronic device may aggregate B4, which is a PCC, and B13, which is an SCC.

Figure 13:
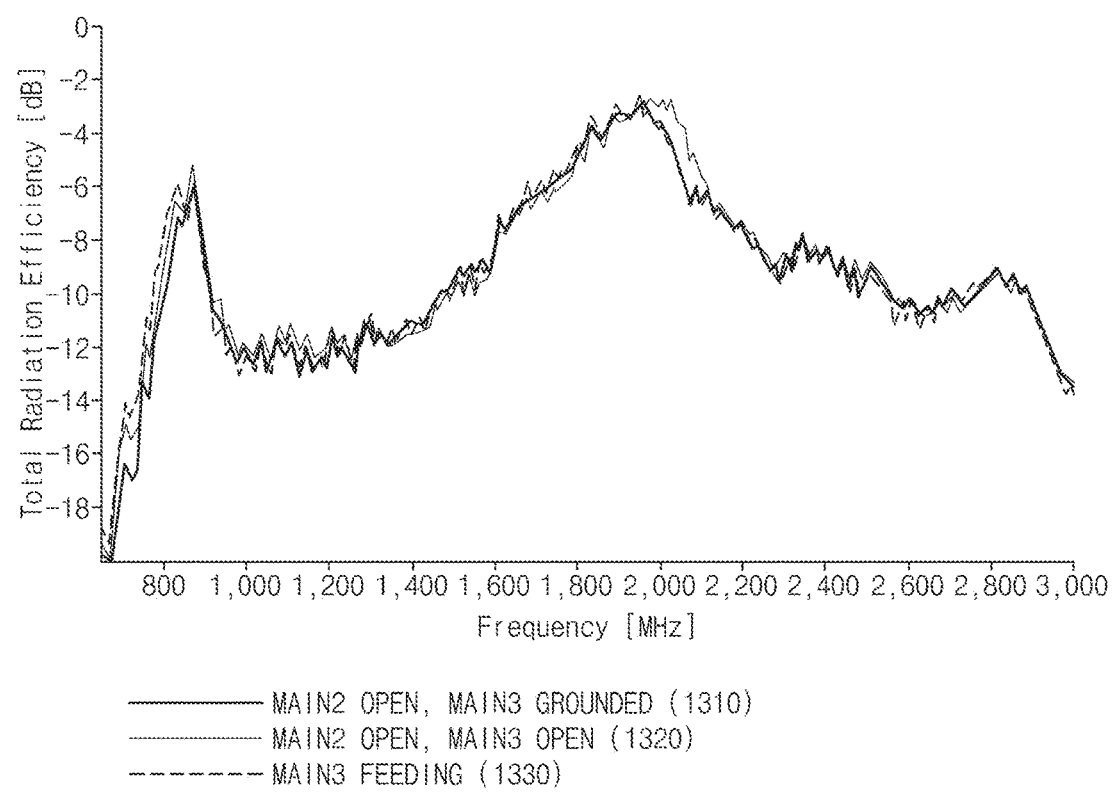
FIG. 13 illustrates frequency dependent total radiation efficiency of an antenna included in an electronic device according to an embodiment of the disclosure.

FIG. 13 illustrates frequency dependent total radiation efficiency of an antenna included in an electronic device according to an embodiment of the disclosure.

Referring to FIG. 13, curves 1310, 1320, and 1330 illustrated in FIG. 13 represent frequency dependent total radiation efficiency of a first antenna radiator (e.g., the first antenna radiator 311 of FIG. 3). The first curve 1310 represents total radiation efficiency of the first antenna radiator in the case where a feeding point of a second antenna radiator (e.g., the second antenna radiator 312 of FIG. 3) is open and a feeding point of a third antenna radiator (e.g., the third antenna radiator 313 of FIG. 3) is grounded. The second curve 1320 represents total radiation efficiency of the first antenna radiator in the case where the feeding point of the second antenna radiator is open and the feeding point of the third antenna radiator is open. The third curve 1330 represents total radiation efficiency of the first antenna radiator in the case where the third antenna radiator receives electric power through the feeding point. The state of the second antenna radiator may be changed by, for example, an operation of the second switching circuit 342 of FIG. 3. The state of the third antenna radiator may be changed by, for example, an operation of the third switching circuit 343 of FIG. 3.

As illustrated in FIG. 13, the total radiation efficiency of the first antenna radiator may be varied depending on a change in the state of the second antenna radiator and the third antenna radiator that are adjacent to the first antenna radiator. For example, the total radiation efficiency of the first antenna radiator may be enhanced by changing the state of an antenna radiator adjacent to the first antenna radiator.

Figure 14:
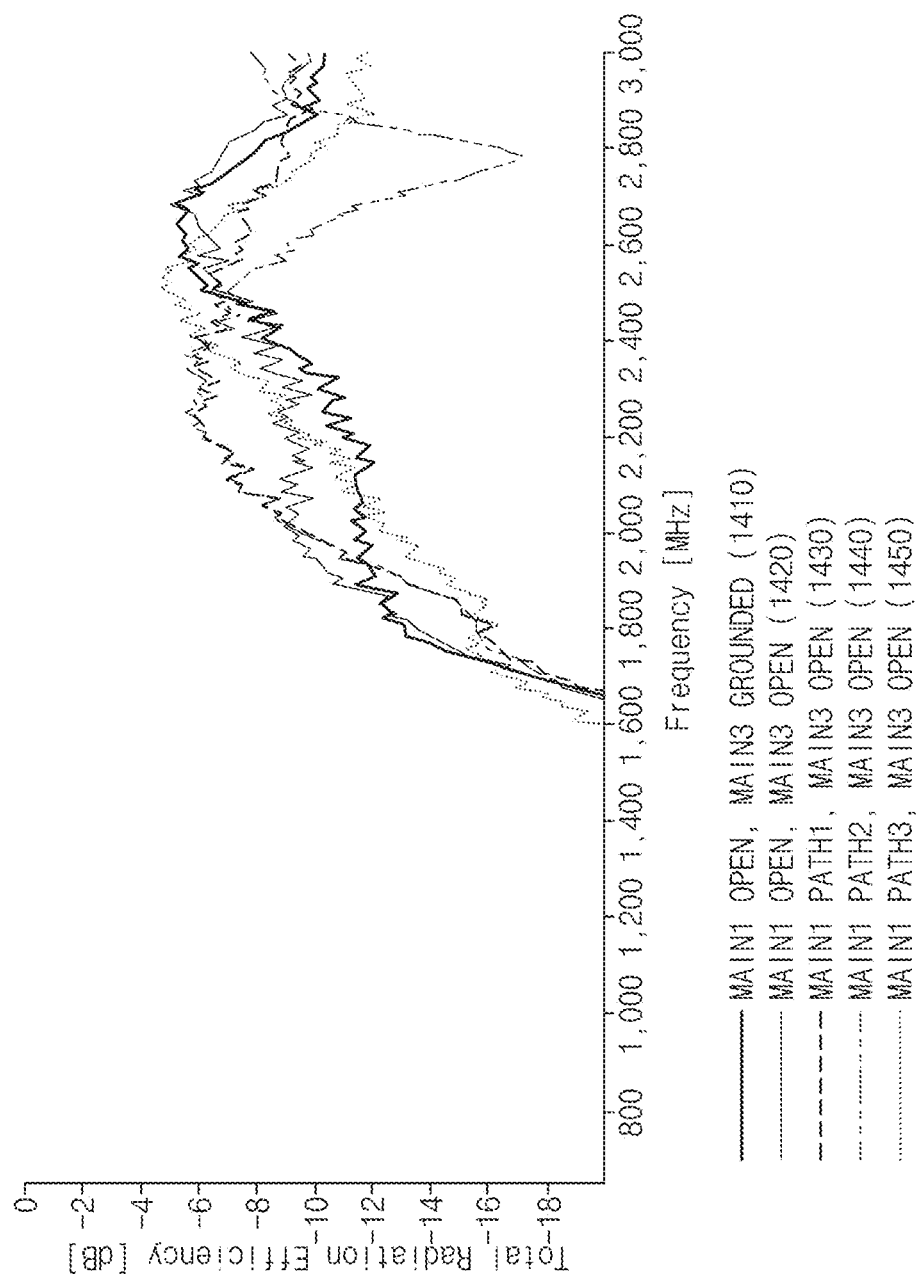
FIG. 14 illustrates frequency dependent total radiation efficiency of an antenna included in an electronic device according to an embodiment of the disclosure.

FIG. 14 illustrates frequency dependent total radiation efficiency of an antenna included in an electronic device according to an embodiment of the disclosure.

Referring to FIG. 14, curves 1410, 1420, 1430, 1440, and 1450 illustrated in FIG. 14 represent frequency dependent total radiation efficiency of a second antenna radiator (e.g., the second antenna radiator 312 of FIG. 3). The first curve 1410 represents total radiation efficiency of the second antenna radiator in the case where a ground point of a first antenna radiator (e.g., the first antenna radiator 311 of FIG. 3) is open and a feeding point of a third antenna radiator (e.g., the third antenna radiator 313 of FIG. 3) is grounded. The second curve 1420 represents total radiation efficiency of the second antenna radiator in the case where the ground point of the first antenna radiator is open and the feeding point of the third antenna radiator is open. The third curve 1430 represents total radiation efficiency of the second antenna radiator in the case where the first antenna radiator is grounded through a first path and the third antenna radiator is open. The fourth curve 1440 represents total radiation efficiency of the second antenna radiator in the case where the first antenna radiator is grounded through a second path and the third antenna radiator is open. The fifth curve 1450 represents total radiation efficiency of the second antenna radiator in the case where the first antenna radiator is grounded through a third path and the third antenna radiator is open. The first path, the second path, and the third path may have different electrical lengths. The state of the first antenna radiator may be changed by, for example, an operation of the first switching circuit 341 of FIG. 3. The state of the third antenna radiator may be changed by, for example, an operation of the third switching circuit 343 of FIG. 3.

As illustrated in FIG. 14, the total radiation efficiency of the second antenna radiator may be varied depending on a change in the state of the first antenna radiator and the third antenna radiator that are adjacent to the second antenna radiator. For example, the total radiation efficiency of the second antenna radiator may be enhanced by changing the state of an antenna radiator adjacent to the second antenna radiator.

Figure 15:
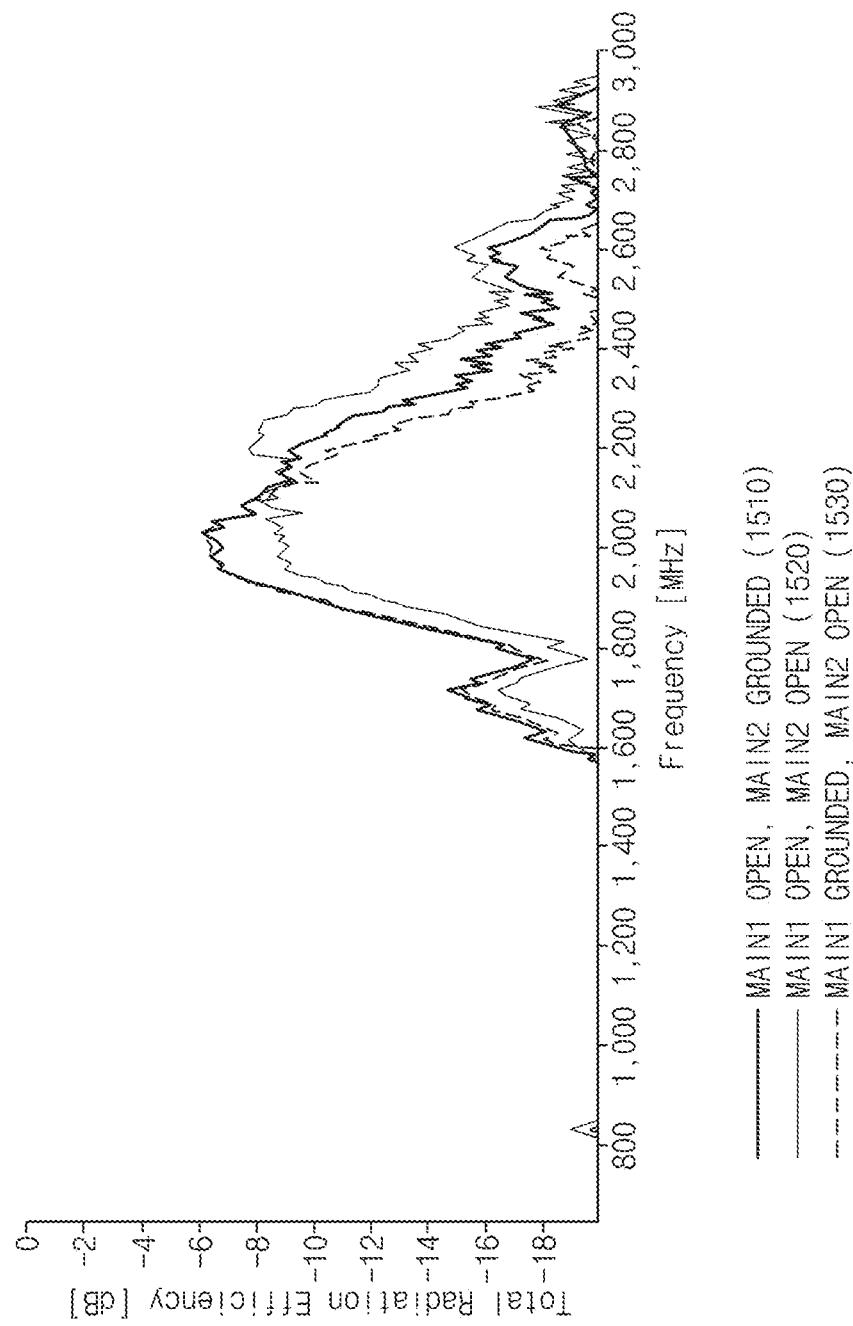
FIG. 15 illustrates frequency dependent total radiation efficiency of an antenna included in an electronic device according to an embodiment of the disclosure.

FIG. 15 illustrates frequency dependent total radiation efficiency of an antenna included in an electronic device according to an embodiment of the disclosure.

Referring to FIG. 15, curves 1510, 1520, and 1530 illustrated in FIG. 15 represent frequency dependent total radiation efficiency of a third antenna radiator (e.g., the third antenna radiator 313 of FIG. 3). The first curve 1510 represents total radiation efficiency of the third antenna radiator in the case where a ground point of a first antenna radiator (e.g., the first antenna radiator 311 of FIG. 3) is open and a feeding point of a second antenna radiator (e.g., the second antenna radiator 312 of FIG. 3) is grounded. The second curve 1520 represents total radiation efficiency of the third antenna radiator in the case where the ground point of the first antenna radiator is open and the feeding point of the second antenna radiator is open. The third curve 1530 represents total radiation efficiency of the third antenna radiator in the case where the ground point of the first antenna radiator is grounded and the second antenna radiator is open. The state of the first antenna radiator may be changed by, for example, an operation of the first switching circuit 341 of FIG. 3. The state of the second antenna radiator may be changed by, for example, an operation of the second switching circuit 342 of FIG. 3.

As illustrated in FIG. 15, the total radiation efficiency of the third antenna radiator may be varied depending on a change in the state of the first antenna radiator and the second antenna radiator that are adjacent to the third antenna radiator. For example, the total radiation efficiency of the third antenna radiator may be enhanced by changing the state of an antenna radiator adjacent to the third antenna radiator.

Figure 16:
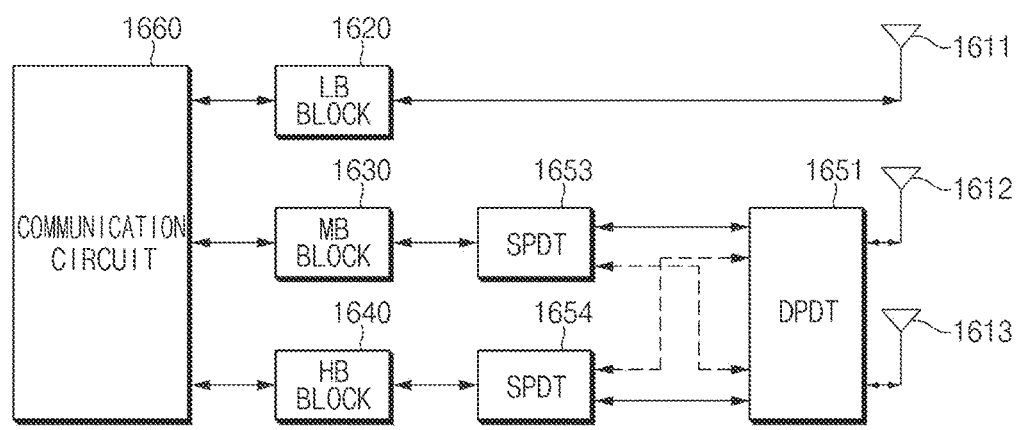
FIG. 16 is a block diagram illustrating a configuration of an electronic device according to an embodiment of the disclosure.

FIG. 16 is a block diagram illustrating a configuration of an electronic device according to an embodiment of the disclosure.

Referring to FIG. 16, an electronic device (e.g., the electronic device 200 of FIG. 2) according to an embodiment may include a first antenna radiator 1611, a second antenna radiator 1612, a third antenna radiator 1613, a first switch 1651, a second switch 1653, a third switch 1654, an LB block 1620, an MB block 1630, an HB block 1640, and a communication circuit 1660.

According to an embodiment, the first antenna radiator 1611 may be configured to transmit and receive LB signals. The first antenna radiator 1611 may be electrically connected with the LB block 1620. The first antenna radiator 1611 may radiate signals output from the LB block 1620. The first antenna radiator 1611 may transfer LB signals received from the outside to the LB block 1620.

According to an embodiment, the LB block 1620 may be electrically connected with the communication circuit 1660. The LB block 1620 may be, for example, an LPAMID (LNA+PAM+FEMID (front-end module with integrated duplexers)) for LB signals. The LB block 1620 may process LB signals transmitted from the first antenna radiator 1611 and may transmit the processed LB signals to the communication circuit 1660. The LB block 1620 may process signals transmitted from the communication circuit 1660 and may transmit processed LB signals to the first antenna radiator 1611.

According to an embodiment, the second antenna radiator 1612 may be configured to transmit and receive MB signals and HB signals. The second antenna radiator 1612 may be electrically connected with the MB block 1630 or the HB block 1640 depending on operations of the first switch 1651, the second switch 1653, and the third switch 1654. The second antenna radiator 1612 may also be open without being connected with the MB block 1630 or the HB block 1640, depending on operations of the first switch 1651, the second switch 1653, and the third switch 1654. The second antenna radiator 1612 may radiate signals output from the MB block 1630 or the HB block 1640. The second antenna radiator 1612 may transfer MB signals or HB signals received from the outside to the MB block 1630 or the HB block 1640.

According to an embodiment, the third antenna radiator 1613 may be configured to transmit and receive MB signals and HB signals. The third antenna radiator 1613 may be electrically connected with the MB block 1630 or the HB block 1640 depending on operations of the first switch 1651, the second switch 1653, and the third switch 1654. For example, the third antenna radiator 1613 may be electrically connected with the MB block 1630 or the HB block 1640 that is not connected with the second antenna radiator 1612. The third antenna radiator 1613 may be open without being connected with the MB block 1630 or the HB block 1640, depending on operations of the first switch 1651, the second switch 1653, and the third switch 1654. The third antenna radiator 1613 may radiate signals output from the MB block 1630 or the HB block 1640. The third antenna radiator 1613 may transfer MB signals or HB signals received from the outside to the MB block 1630 or the HB block 1640.

According to an embodiment, the first switch 1651 may connect the second antenna radiator 1612 with the second switch 1653 and may connect the third antenna radiator 1613 with the third switch 1654 (solid-line paths). According to another embodiment, the first switch 1651 may connect the second antenna radiator 1612 with the third switch 1654 and may connect the third antenna radiator 1613 with the second switch 1653 (dotted-line paths). The first switch 1651 may be, for example, a double pole double throw (DPDT) switch.

According to an embodiment, the second switch 1653 may or may not connect the second or third antenna radiator 1612 or 1613 connected thereto through the first switch 1651 with the MB block 1630. In the case where the second switch 1653 and the second or third antenna radiator 1612 or 1613 are connected, the second switch 1653 may transfer signals from the connected antenna radiator to the MB block 1630 and may transfer signals from the MB block 1630 to the connected antenna radiator. The second switch 1653 may be, for example, a single pole double throw (SPDT) switch.

According to an embodiment, the third switch 1654 may or may not connect the second or third antenna radiator 1612 or 1613 connected thereto through the first switch 1651 with the HB block 1640. In the case where the third switch 1654 and the second or third antenna radiator 1612 or 1613 are connected, the third switch 1654 may transfer signals from the connected antenna radiator to the HB block 1640 and may transfer signals from the HB block 1640 to the connected antenna radiator. The third switch 1654 may be, for example, an SPDT switch.

According to an embodiment, the MB block 1630 may be electrically connected with the communication circuit 1660. The MB block 1630 may be, for example, an LPAMID for MB signals. The MB block 1630 may process signals transmitted from the second antenna radiator 1612 or the third antenna radiator 1613 and may transmit processed MB signals to the communication circuit 1660. The MB block 1630 may process signals transmitted from the communication circuit 1660 and may transmit processed MB signals to the second antenna radiator 1612 or the third antenna radiator 1613.

According to an embodiment, the HB block 1640 may be electrically connected with the communication circuit 1660. The HB block 1640 may be, for example, an LPAMID for HB signals. The HB block 1640 may process signals transmitted from the second antenna radiator 1612 or the third antenna radiator 1613 and may transmit processed HB signals to the communication circuit 1660. The HB block 1640 may process signals transmitted from the communication circuit 1660 and may transmit processed HB signals to the second antenna radiator 1612 or the third antenna radiator 1613.

According to an embodiment, the communication circuit 1660 may be electrically connected with the LB block 1620, the MB block 1630, and the HB block 1640. The communication circuit 1660 may process signals received from the LB block 1620, the MB block 1630, and/or the HB block 1640 and may transmit signals to the LB block 1620, the MB block 1630, and/or the HB block 1640. The communication circuit 1660 may control the LB block 1620, the MB block 1630, the HB block 1640, the first switch 1651, the second switch 1653, and the third switch 1654.

Figure 17:
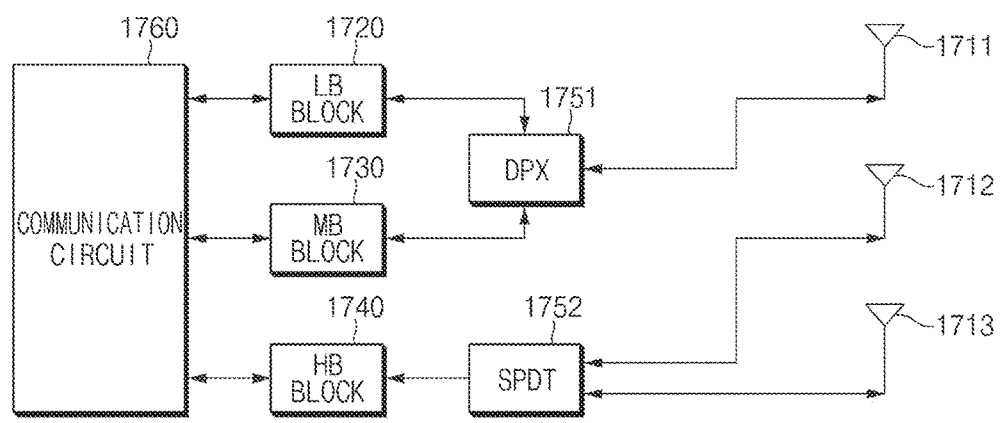
FIG. 17 is a block diagram illustrating a configuration of an electronic device according to an embodiment of the disclosure.

FIG. 17 is a block diagram illustrating a configuration of an electronic device according to an embodiment of the disclosure.

Referring to FIG. 17, an electronic device (e.g., the electronic device 200 of FIG. 2) according to an embodiment may include a first antenna radiator 1711, a second antenna radiator 1712, a third antenna radiator 1713, a diplexer 1751, a switch 1752, an LB block 1720, an MB block 1730, an HB block 1740, and a communication circuit 1760.

According to an embodiment, the first antenna radiator 1711 may be configured to transmit and receive LB signals and MB signals. The first antenna radiator 1711 may be electrically connected with the diplexer 1751. The first antenna radiator 1711 may radiate LB signals or MB signals transmitted from the diplexer 1751. The first antenna radiator 1711 may transfer LB signals or MB signals received from the outside to the diplexer 1751.

According to an embodiment, the diplexer 1751 may be electrically connected with the LB block 1720 or the MB block 1730. The diplexer 1751 may filter LB signals from signals received from the first antenna radiator 1711 and may transmit the filtered signals to the LB block 1720. The diplexer 1751 may filter MB signals from the signals received from the first antenna radiator 1711 and may transmit the filtered signals to the MB block 1730.

According to an embodiment, the LB block 1720 may process the LB signals transmitted from the diplexer 1751 and may transmit the processed LB signals to the communication circuit 1760. The LB block 1720 may process signals transmitted from the communication circuit 1760 and may transmit processed LB signals to the diplexer 1751.

According to an embodiment, the MB block 1730 may process the MB signals transmitted from the diplexer 1751 and may transmit the processed MB signals to the communication circuit 1760. The MB block 1730 may process signals transmitted from the communication circuit 1760 and may transmit processed MB signals to the diplexer 1751.

According to an embodiment, the second antenna radiator 1712 may be configured to transmit and receive HB signals. The second antenna radiator 1712 may be electrically connected with the switch 1752. The second antenna radiator 1712 may or may not be electrically connected with the HB block 1740 depending on an operation of the switch 1752. The second antenna radiator 1712 may radiate HB signals transmitted from the switch 1752. The second antenna radiator 1712 may transfer HB signals received from the outside to the switch 1752.

According to an embodiment, the third antenna radiator 1713 may be configured to transmit and receive HB signals. The third antenna radiator 1713 may be electrically connected with the switch 1752. The third antenna radiator 1713 may or may not be electrically connected with the HB block 1740 depending on an operation of the switch 1752. The third antenna radiator 1713 may radiate HB signals transmitted from the switch 1752. The third antenna radiator 1713 may transfer HB signals received from the outside to the switch 1752.

According to an embodiment, the switch 1752 may electrically connect the second antenna radiator 1712 or the third antenna radiator 1713 with the HB block 1740. The switch 1752 may transfer signals from the second antenna radiator 1712 or the third antenna radiator 1713 to the HB block 1740 and may transfer signals from the HB block 1740 to the second antenna radiator 1712 or the third antenna radiator 1713. The switch 1752 may be, for example, an SPDT switch.

According to an embodiment, the HB block 1740 may process HB signals transmitted from the switch 1752 and may transmit the processed HB signals to the communication circuit 1760. The HB block 1740 may process signals transmitted from the communication circuit 1760 and may transmit processed HB signals to the switch 1752.

According to an embodiment, the communication circuit 1760 may be electrically connected with the LB block 1720, the MB block 1730, and the HB block 1740. The communication circuit 1760 may process signals received from the LB block 1720, the MB block 1730, and/or the HB block 1740 and may transmit signals to the LB block 1720, the MB block 1730, and/or the HB block 1740. The communication circuit 1760 may control the LB block 1720, the MB block 1730, the HB block 1740, and the switch 1752.

Figure 18:
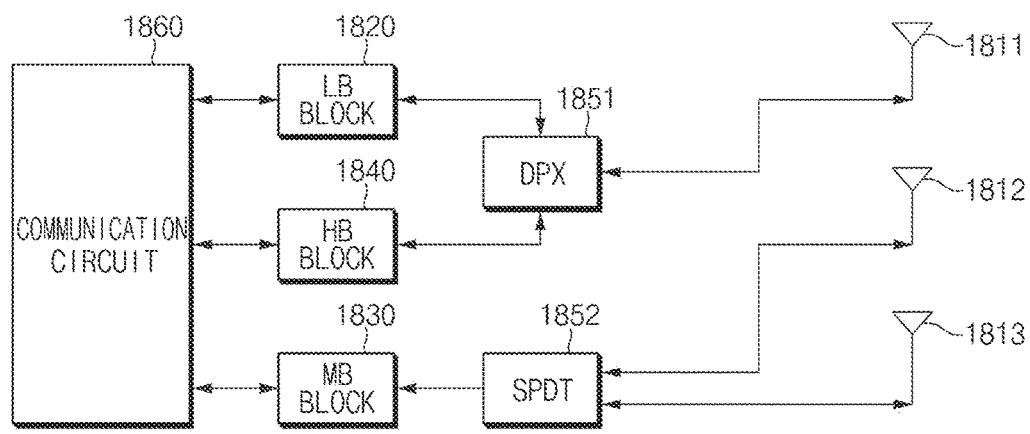
FIG. 18 is a block diagram illustrating a configuration of an electronic device according to an embodiment of the disclosure.

FIG. 18 is a block diagram illustrating a configuration of an electronic device according to an embodiment of the disclosure.

Referring to FIG. 18, an electronic device (e.g., the electronic device 200 of FIG. 2) according to an embodiment may include a first antenna radiator 1811, a second antenna radiator 1812, a third antenna radiator 1813, a diplexer 1851, a switch 1852, an LB block 1820, an MB block 1830, an HB block 1840, and a communication circuit 1860.

According to an embodiment, the first antenna radiator 1811 may be configured to transmit and receive LB signals and HB signals. The first antenna radiator 1811 may be electrically connected with the diplexer 1851. The first antenna radiator 1811 may radiate LB signals or HB signals transmitted from the diplexer 1851. The first antenna radiator 1811 may transfer LB signals or HB signals received from the outside to the diplexer 1851.

According to an embodiment, the diplexer 1851 may be electrically connected with the LB block 1820 or the HB block 1840. The diplexer 1851 may filter LB signals from signals received from the first antenna radiator 1811 and may transmit the filtered signals to the LB block 1820. The diplexer 1851 may filter HB signals from the signals received from the first antenna radiator 1711 and may transmit the filtered signals to the HB block 1840.

According to an embodiment, the LB block 1820 may process the LB signals transmitted from the diplexer 1851 and may transmit the processed LB signals to the communication circuit 1860. The LB block 1820 may process signals transmitted from the communication circuit 1860 and may transmit processed LB signals to the diplexer 1851.

According to an embodiment, the HB block 1840 may process the HB signals transmitted from the diplexer 1851 and may transmit the processed HB signals to the communication circuit 1860. The HB block 1840 may process signals transmitted from the communication circuit 1860 and may transmit processed HB signals to the diplexer 1851.

According to an embodiment, the second antenna radiator 1812 may be configured to transmit and receive MB signals. The second antenna radiator 1812 may be electrically connected with the switch 1852. The second antenna radiator 1812 may or may not be electrically connected with the MB block 1830 depending on an operation of the switch 1852. The second antenna radiator 1812 may radiate MB signals transmitted from the switch 1852. The second antenna radiator 1812 may transfer MB signals received from the outside to the switch 1852.

According to an embodiment, the third antenna radiator 1813 may be configured to transmit and receive MB signals. The third antenna radiator 1813 may be electrically connected with the switch 1852. The third antenna radiator 1813 may or may not be electrically connected with the MB block 1830 depending on an operation of the switch 1852. The third antenna radiator 1813 may radiate MB signals transmitted from the switch 1852. The third antenna radiator 1813 may transfer MB signals received from the outside to the switch 1852.

According to an embodiment, the switch 1852 may electrically connect the second antenna radiator 1812 or the third antenna radiator 1813 with the MB block 1830. The switch 1852 may transfer signals from the second antenna radiator 1812 or the third antenna radiator 1813 to the MB block 1830 and may transfer signals from the MB block 1830 to the second antenna radiator 1812 or the third antenna radiator 1813. The switch 1852 may be, for example, an SPDT switch.

According to an embodiment, the MB block 1830 may process MB signals transmitted from the switch 1852 and may transmit the processed MB signals to the communication circuit 1860. The MB block 1830 may process signals transmitted from the communication circuit 1860 and may transmit processed MB signals to the switch 1852.

According to an embodiment, the communication circuit 1860 may be electrically connected with the LB block 1820, the MB block 1830, and the HB block 1840. The communication circuit 1860 may process signals received from the LB block 1820, the MB block 1830, and/or the HB block 1840 and may transmit signals to the LB block 1820, the MB block 1830, and/or the HB block 1840. The communication circuit 1860 may control the LB block 1820, the MB block 1830, the HB block 1840, and the switch 1852.

Figure 19:
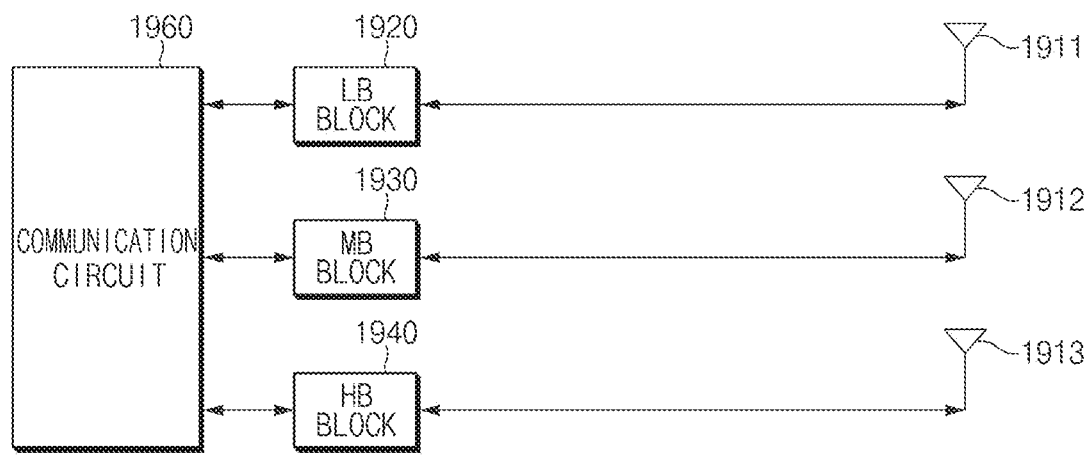
FIG. 19 is a block diagram illustrating a configuration of an electronic device according to an embodiment of the disclosure.

FIG. 19 is a block diagram illustrating a configuration of an electronic device according to an embodiment of the disclosure.

Referring to FIG. 19, an electronic device (e.g., the electronic device 200 of FIG. 2) according to an embodiment may include a first antenna radiator 1911, a second antenna radiator 1912, a third antenna radiator 1913, an LB block 1920, an MB block 1930, an HB block 1940, and a communication circuit 1960.

According to an embodiment, the first antenna radiator 1911 may be configured to transmit and receive LB signals. The first antenna radiator 1911 may be electrically connected with the LB block 1920. The first antenna radiator 1911 may radiate LB signals transmitted from the LB block 1920. The first antenna radiator 1911 may transfer LB signals received from the outside to the LB block 1920.

According to an embodiment, the LB block 1920 may process the LB signals transmitted from the first antenna radiator 1911 and may transmit the processed LB signals to the communication circuit 1960. The LB block 1920 may process signals transmitted from the communication circuit 1960 and may transmit processed LB signals to the first antenna radiator 1911.

According to an embodiment, the second antenna radiator 1912 may be configured to transmit and receive MB signals. The second antenna radiator 1912 may be electrically connected with the MB block 1930. The second antenna radiator 1912 may radiate MB signals transmitted from the MB block 1930. The second antenna radiator 1912 may transfer MB signals received from the outside to the MB block 1930.

According to an embodiment, the MB block 1930 may process the MB signals transmitted from the second antenna radiator 1912 and may transmit the processed MB signals to the communication circuit 1960. The MB block 1930 may process signals transmitted from the communication circuit 1960 and may transmit processed MB signals to the second antenna radiator 1912.

According to an embodiment, the third antenna radiator 1913 may be configured to transmit and receive HB signals. The third antenna radiator 1913 may be electrically connected with the HB block 1940. The third antenna radiator 1913 may radiate HB signals transmitted from the HB block 1940. The third antenna radiator 1913 may transfer HB signals received from the outside to the HB block 1940.

According to an embodiment, the HB block 1940 may process the HB signals transmitted from the third antenna radiator 1913 and may transmit the processed HB signals to the communication circuit 1960. The HB block 1940 may process signals transmitted from the communication circuit 1960 and may transmit processed HB signals to the third antenna radiator 1913.

According to an embodiment, the communication circuit 1960 may be electrically connected with the LB block 1920, the MB block 1930, and the HB block 1940. The communication circuit 1960 may process signals received from the LB block 1920, the MB block 1930, and/or the HB block 1940 and may transmit signals to the LB block 1920, the MB block 1930, and/or the HB block 1940. The communication circuit 1960 may control the LB block 1920, the MB block 1930, and the HB block 1940.

According to an embodiment, the first antenna radiator 1911, the second antenna radiator 1912, and the third antenna radiator 1913 may be designed to cover different frequency bands, and therefore an element, such as a diplexer or a switch, may not be required between the antenna radiators 1911, 1912, and 1913 and the RF blocks 1920, 1930, and 1940. Accordingly, antenna efficiency may be enhanced.

Figure 20:
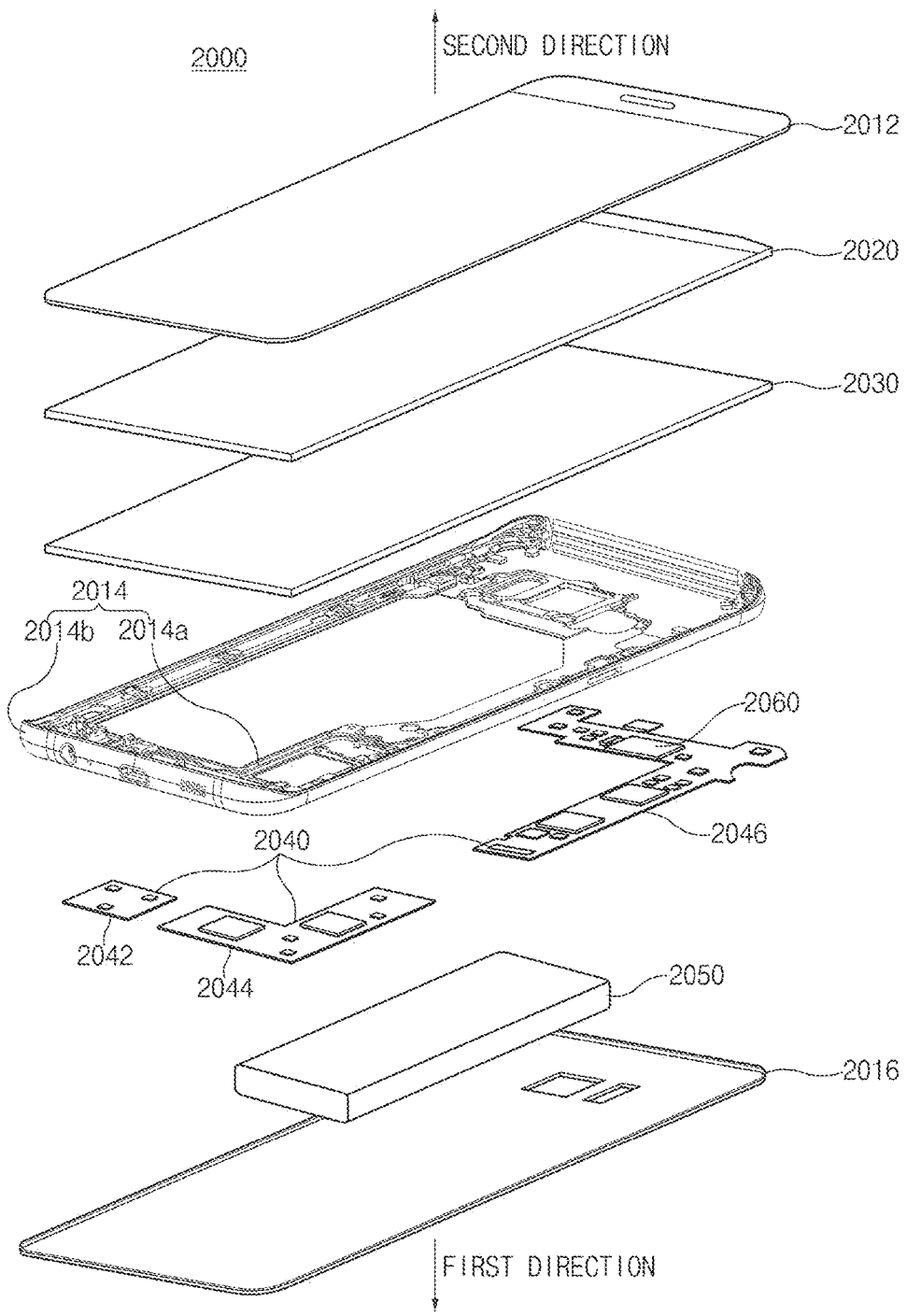
FIG. 20 is an exploded perspective view of an electronic device according to an embodiment.

FIG. 20 is an exploded perspective view of an electronic device according to an embodiment of the disclosure.

Referring to FIG. 20, an electronic device 2000 according to an embodiment may include a cover glass 2012, a display 2020, a shielding layer 2030, a housing 2014, a printed circuit board (PCB) 2040, a battery 2050, a communication circuit 2060, and a back cover 2016. According to an embodiment, the electronic device 2000 may not include some of the elements illustrated in FIG. 20 or may further include other non-illustrated elements. Furthermore, the elements included in the electronic device 2000 may be stacked in a different sequence from that illustrated in FIG. 20.

The cover glass 2012 may pass light generated by the display 2020. Furthermore, a user may perform a touch (including contact using an electronic pen) by touching the cover glass 2012 with a part (e.g., a finger) of his/her body. The cover glass 2012 may be formed of, for example, reinforced glass, reinforced plastic, a flexible polymer material, or the like. The cover glass 2012 may also be referred to as a glass window.

According to an embodiment, the housing 2014 may protect elements included in the electronic device 2000. For example, the display 2020, the PCB 2040, the battery 2050, and the like may be received in the housing 2014, and the housing 2014 may protect the elements from external shocks.

According to an embodiment, the housing 2014 may include a support member (e.g., a bracket) 2014*a* not being exposed outside the electronic device 2000 and a lateral member 2014*b* exposed outside the electronic device 2000. For example, the support member 2014*a* may support components (e.g., the display 2020, the PCB 2040, and the like) included in the electronic device 2000. The lateral member 2014*b* may at least partly contain a conductive material (e.g., metal). For example, the lateral member 2014*b* formed of metal may be referred to as a metal bezel. According to an embodiment, at least a portion of the metal bezel may be used as an antenna element for transmitting and receiving signals of a specified frequency band.

According to an embodiment, the back cover 2016 may be combined with the housing 2014. The back cover 2016 may contain reinforced glass, plastic, and/or metal. According to an embodiment, the back cover 2016 may be implemented integrally with the housing 2014 or may be implemented to be detachable by a user.

According to an embodiment, the display 2020 may be disposed between the cover glass 2012 and the shielding layer 2030. The display 2020 may be electrically connected with the PCB 2040 and may output contents (e.g., text, images, videos, icons, widgets, or symbols). The display 2020 may receive a touch input (e.g., a touch, a gesture, or hovering) from a user.

According to an embodiment, the shielding layer 2030 may be disposed between the display 2020 and the support member 2014*a*. The shielding layer 2030 may shield electromagnetic waves generated between the display 2020 and the PCB 2040 to prevent electro-magnetic interference between the display 2020 and the PCB 2040.

According to an embodiment, the shielding layer 2030 may include a thin sheet or plate formed of copper (Cu) or graphite. For example, in the case where the shielding layer 2030 is formed of copper or graphite, at least some of the elements included in the electronic device 2000 may be grounded to the shielding layer 2030.

According to an embodiment, various types of electronic components, elements, or printed circuits of the electronic device 2000 may be mounted on the PCB 2040. For example, an application processor (AP), a communication processor (CP), or the communication circuit 2060 may be mounted on the PCB 2040. In this disclosure, the PCB 2040 may be referred to as a main board or a printed board assembly (PBA).

According to an embodiment, the PCB 2040 may include a first PCB 2042, a second PCB 2044, and a third PCB 2046. For example, the first PCB 2042 or the second PCB 2044 may correspond to a sub-PCB disposed on a lower end of the electronic device 2000. Furthermore, the third PCB 2046 may correspond to a main PCB electrically connected with the sub-PCB. For example, the main PCB may be construed as a PCB having a processor mounted thereon. In FIG. 20, the PCB 2040 is illustrated as including the three PCBs 2042, 2044, and 2046. Without being limited thereto, however, the PCB 2040 may include one or two PCBs.

According to an embodiment, the first PCB 2042, the second PCB 2044, and/or the third PCB 2046 may be electrically connected together. For example, the first PCB 2042 and the second PCB 2044 may be electrically connected together through a specified connector or specified interconnection wiring (e.g., a flexible printed circuit board (FPCB)).

According to an embodiment, the battery 2050 may convert chemical energy into electrical energy, and vice versa. For example, the battery 2050 may convert chemical energy into electrical energy and may supply the converted electrical energy to the display 2020 and various components or modules mounted on the PCB 2040. The battery 2050 may also convert electrical energy supplied from the outside into chemical energy and may store the chemical energy. According to an embodiment, a power management module for managing charge/discharge of the battery 2050 may be included in the PCB 2040.

According to an embodiment, the communication circuit 2060 may be disposed on the PCB 2040. Although FIG. 20 illustrates that the communication circuit 2060 is disposed on the third PCB 2046, the communication circuit 2060 may be disposed on the first PCB 2042 or the second PCB 2044. The communication circuit 2060 may supply electric power for an antenna element to transmit/receive signals.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 130).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 130) in the form of a program module. The instruction, when executed by a processor (e.g., a processor 120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising: a first antenna radiator for resonating in a first band and disposed in the middle of one end of the electronic device; a second antenna radiator for resonating in a second band and a third band higher than the first band, the second antenna radiator spaced apart from the first antenna radiator and disposed adjacent to one end of the first antenna radiator; a third antenna radiator for resonating in the second band and the third band, the third antenna radiator spaced apart from the first antenna radiator and the second antenna radiator; a communication circuit; a first feeding part electrically connecting the communication circuit and the first antenna radiator; a second feeding part electrically connecting the communication circuit and the second antenna radiator; and a third feeding part electrically connecting the communication circuit and the third antenna radiator, wherein the communication circuit is configured to: receive a signal in the second band using the third antenna radiator while transmitting and receiving the signal in the second band using the second antenna radiator, and receive a signal in the third band using the second antenna radiator while transmitting and receiving the signal in the third band using the third antenna radiator.

2. The electronic device of claim 1,
wherein the third antenna radiator is disposed adjacent to an opposite end of the first antenna radiator, and
wherein each of the first antenna radiator, the second antenna radiator, and the third antenna radiator includes a portion of a metal frame of the electronic device.

3. The electronic device of claim 1, further comprising:
a printed circuit board,
wherein each of the first antenna radiator and the second antenna radiator includes a portion of a metal frame of the electronic device, and
wherein the third antenna radiator includes a conductive pattern printed on the printed circuit board.

4. The electronic device of claim 1, further comprising:
a first conductive pad; and
a second conductive pad spaced apart from the first conductive pad and electrically coupled with the first conductive pad,
wherein one of the first antenna radiator or the second antenna radiator is electrically connected with the communication circuit through the first conductive pad and the second conductive pad.

5. The electronic device of claim 4,
wherein the first feeding part is electrically connected with the first antenna radiator through a first point adjacent to the one end of the first antenna radiator,
wherein the second feeding part is electrically connected with the second antenna radiator through a second point adjacent to one end of the second antenna radiator, and
wherein the one end of the second antenna radiator is disposed adjacent to the one end of the first antenna radiator.

6. The electronic device of claim 1, further comprising:
a first conductive pad;
a second conductive pad spaced apart from the first conductive pad and electrically coupled with the first conductive pad; and
a switch selectively electrically connecting the first conductive pad or the second conductive pad with the communication circuit,
wherein the communication circuit is configured to control the switch.

7. The electronic device of claim 1, further comprising:
a first RF block for a signal in the first band, wherein the first RF block is electrically connected with the first antenna radiator through the first feeding part;
a second RF block for a signal in the second band, wherein the second RF block is electrically connected with the second antenna radiator through the second feeding part; and
a third RF block for a signal in the third band, wherein the third RF block is electrically connected with the third antenna radiator through the third feeding part.

* * * * *